(12) United States Patent
Sakai et al.

(10) Patent No.: US 6,800,845 B2
(45) Date of Patent: Oct. 5, 2004

(54) MULTI-BEAM SCANNING DEVICE, MULTI-BEAM SCANNING METHOD, LIGHT SOURCE DEVICE, AND IMAGE FORMING APPARATUS

(75) Inventors: Kohji Sakai, Tokyo (JP); Seizo Suzuki, Kanagawa (JP); Hiromichi Atsuumi, Kanagawa (JP); Akihisa Itabashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/460,410

(22) Filed: Jun. 13, 2003

(65) Prior Publication Data

US 2003/0209659 A1 Nov. 13, 2003

Related U.S. Application Data

(62) Division of application No. 09/788,415, filed on Feb. 21, 2001, now Pat. No. 6,596,985.

(30) Foreign Application Priority Data

Feb. 22, 2000 (JP) ........................................ 2000-044929
Feb. 23, 2000 (JP) ........................................ 2000-046368

(51) Int. Cl.[7] .............................................. G02B 26/08
(52) U.S. Cl. ..................................... 250/234; 359/205
(58) Field of Search ................................ 250/234, 235, 250/236; 359/204, 205, 208, 207, 206; 358/494

(56) References Cited

U.S. PATENT DOCUMENTS 5,270,851 A  12/1993  Makino et al.
5,442,477 A  8/1995   Lima
5,710,654 A  1/1998   Ota
6,104,520 A  8/2000   Yamawaki
6,596,985 B2 * 7/2003  Sakai et al. ................. 250/234

* cited by examiner

Primary Examiner—David V. Bruce
Assistant Examiner—Hoon Song
(74) Attorney, Agent, or Firm—Oblon, Spivak, McClelland, Maier & Neustadt, P.C.

(57) ABSTRACT

In a multi-beam scanning device and method of the present invention, a semiconductor laser array having a plurality of light emitting parts emitting multiple laser beams is provided. A rotary deflector deflects the laser beams emitted by the light emitting parts of the semiconductor laser array. The deflected laser beams from the rotary deflector is focused onto a scanned surface to form a plurality of beam spots that are separated on the scanned surface in a sub-scanning direction, the scanned surface being scanned simultaneously with the plurality of beam spots in a main scanning direction by a rotation of the rotary deflector. The laser array is configured such that the light emitting parts are arrayed along a line that is at an inclination angle $\phi$ to the sub-scanning direction, the inclination angle $\phi$ measured in degrees and meeting the conditions $0 \leq \phi < 90$, and that a scanning line pitch P, an array pitch $p$ of the light emitting parts of the laser array and a parameter K defined by the equation $K = 0.82\ \lambda/\omega z$, where $\lambda$ is a wavelength of the emitted laser beams and $\omega z$ is a target beam spot diameter in the sub-scanning direction, satisfy the following conditions:

$$0.01 < K \cdot P/(p \cdot \cos \phi) < 0.30$$

$$0.011 < K < 0.030.$$

20 Claims, 16 Drawing Sheets

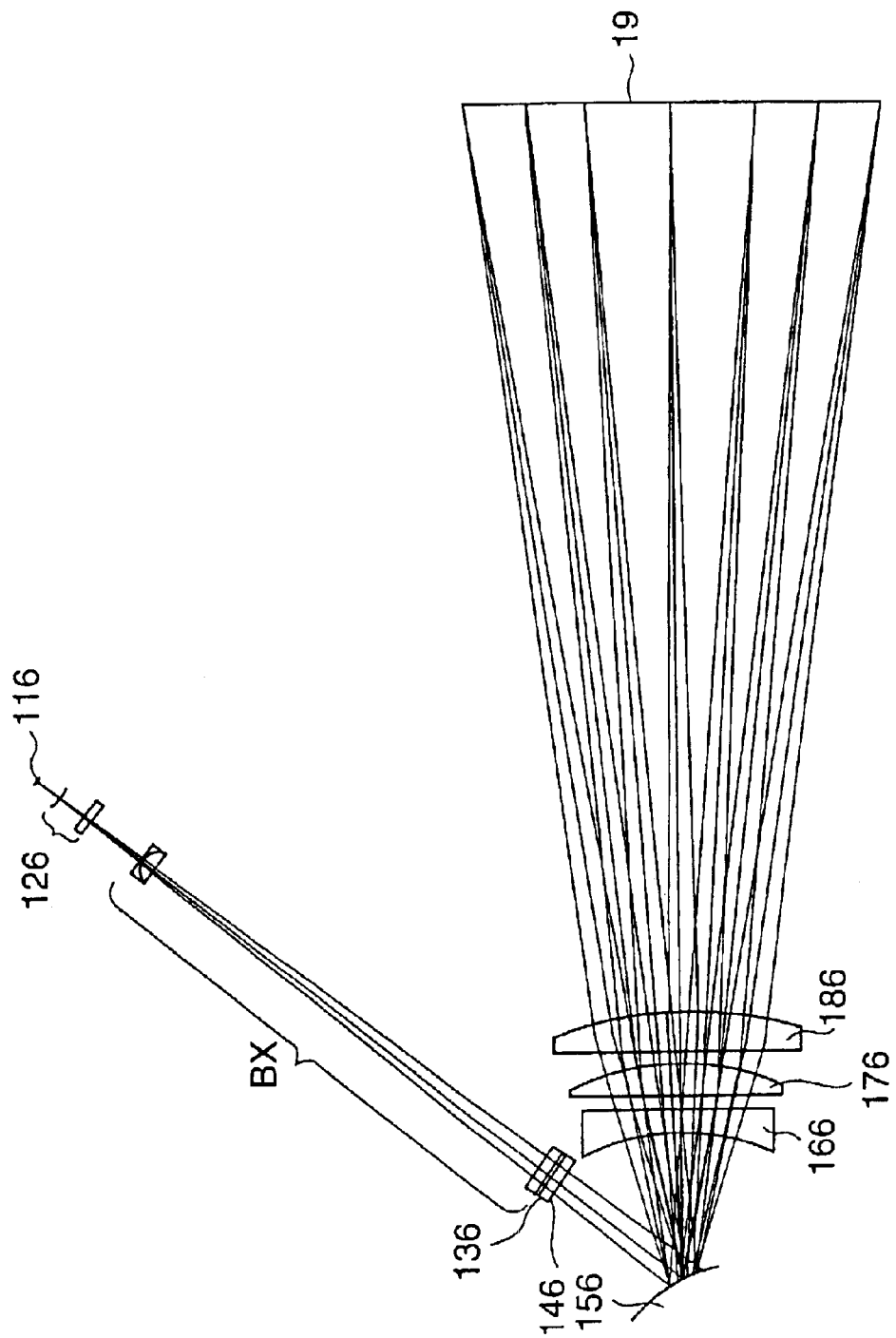

MULTI-BEAM SCANNING DEVICE, MULTI-BEAM SCANNING METHOD, LIGHT SOURCE DEVICE, AND IMAGE FORMING APPARATUS

This application is a Division of application Ser. No. 09/788,415, filed on Feb. 21, 2001, now U.S. Pat. No. 6,596,985.

BACKGROUND OF THE INVENTION

1. Field of the Invention

The present invention relates to a multi-beam scanning device, a multi-beam scanning method, and a light source device for use in the multi-beam scanning device. Further, the present invention relates to an image forming apparatus in which the multi-beam scanning device is provided.

2. Description of the Related Art

With the widespread use of image forming apparatus, such as laser printers and digital copiers, there is an increasing demand for improved printing speeds of the image forming apparatus. To meet the requirement, a multi-beam scanning device having a plurality of light sources is proposed for use in the image forming apparatus. In the multi-beam scanning device, the plurality of light sources, such as laser diodes, are used to emit multiple light beams for scanning the scanned surface with the multiple light spots at a time. For example, a multi-beam scanning device using a semiconductor laser array as the plurality of light sources is known.

When the optical scanning is performed on a scanned surface of a photosensitive medium at a higher density (e.g., above 600 dpi) with the multi-beam scanning device, the pitch of the scanning lines is decreased to a smaller level to achieve the high-density scanning, and the diameter of beam spots on the photosensitive medium surface in the sub-scanning direction must be decreased accordingly. A beam spot is formed on the scanned surface by the focused laser beam from the light source. The scanned surface that is actually scanned with the focused laser beam does not necessarily accord with an image surface where the beam spot is precisely formed at the waist of the laser beam due to the field curvature of the focusing lens or the like of the optical scanning device. The diameter of the beam spot on the scanned surface is not necessarily equal to the beam waist diameter. To reduce the variation of the beam spot diameter as much as possible, the correction of the field curvature of the focusing lens is carried out.

Further, optical scanning devices after assembly contain several kinds of errors, regardless of whether they are the multi-beam scanning device or the single-beam scanning device. Such errors include respective errors of the component parts of the optical scanning device, an assembly error of the optical scanning device, and others. When such errors exist in the optical scanning device, the beam spot formed on the scanned surface with the light beam from the optical scanning device is in a defocus state. The scanned surface that is actually scanned with the focused laser beam is liable to variations of the image surface.

By taking the above matters into consideration, it is necessary that the designing of a multi-beam scanning device be based on the assumption that the beam spot on the scanned surface is in a defocus state. In most cases, the multi-beam scanning device is designed such that the variations of the beam spot diameter fall within a range of ±10% of a target beam spot diameter "W". Namely, the beam spot diameter, which is provided by the multi-beam scanning device, is in a range from 0.9 W to 1.1 W, where W is a target beam spot diameter.

When the beam spot on the scanned surface is in a defocus state, the beam spot diameter is larger than the beam waist diameter. In designing the optical systems of the multi-beam scanning device, the practical measure is to determine a permissible beam spot diameter that is smaller than the target beam spot diameter by 1 to 10 percents. A range of the defocus amount in which the variations of the beam spot diameter are less than the above-mentioned permissible beam spot diameter is called a depth clearance. When the depth clearance is large, the degree of allowance for the variations of the scanned surface to the image surface is high. It is known from practical experience that the depth clearance that is above 0.9 mm is needed to eliminate the component part errors or the assembly errors.

Moreover, in the conventional multi-beam scanning device, the divergence angle of laser beams emitted by the semiconductor laser array is liable to variations. Generally, a semiconductor laser as in the semiconductor laser array emits a divergent laser beam. The divergence angle is at the maximum in the direction of thickness of the activated layer of the semiconductor laser and at the minimum in the direction perpendicular to the activated layer. The far-field pattern of such laser beam is in the form of an ellipse having a major axis parallel to the direction of thickness of the activated layer. In the semiconductor laser array described above, the respective divergence angles of the laser beams emitted by the plurality of light emitting parts are not common, and the divergence angle for each of the plurality of light emitting parts is liable to variations. Hence, the diameters of beam spots, which are formed on the scanned surface by the conventional multi-beam scanning device, are also liable to variations due to the variations of the divergence angles. This causes the degradation of the quality of a reproduced image.

SUMMARY OF THE INVENTION

In order to overcome the above-described problems, it is an object of the present invention to provide a multi-beam scanning device that ensures adequate depth clearance even when the optical scanning is performed at a high density above 600 dpi, and effectively reduces the variations of the beam spots on the scanned surface to a smallest possible level so that the multi-beam scanning is carried out with accurate beam spot diameter so as to create good quality of a reproduced image.

Another object of the present invention is to provide a multi-beam scanning method that ensures adequate depth clearance even when the optical scanning is performed at a high density above 600 dpi, and effectively reduces the variations of the beam spots on the scanned surface to a smallest possible level so that the multi-beam scanning is carried out with accurate beam spot diameter so as to create good quality of a reproduced image.

Another object of the present invention is to provide a light source device for use in a multi-beam scanning device that ensures adequate depth clearance even when the optical scanning is performed at a high density above 600 dpi, and effectively reduces the variations of the beam spots on the scanned surface to a smallest possible level so that the multi-beam scanning is carried out with accurate beam spot diameter so as to create good quality of a reproduced image.

Another object of the present invention is to provide an image forming apparatus in which a multi-beam scanning device is provided, the multi-beam scanning device ensuring adequate depth clearance even when the optical scanning is performed at a high density above 600 dpi, and effectively reducing the variations of the beam spots on the scanned surface to a smallest possible level so that the multi-beam scanning is carried out with accurate beam spot diameter so as to create good quality of a reproduced image.

The above-mentioned objects of the present invention are achieved by a multi-beam scanning device comprising: a semiconductor laser array which has a plurality of light emitting parts emitting multiple laser beams; a rotary deflector which deflects the laser beams emitted by the light emitting parts of the semiconductor laser array; and a focusing optical system which focuses the deflected laser beams from the rotary deflector onto a scanned surface to form a plurality of beam spots that are separated on the scanned surface in a sub-scanning direction, the scanned surface being scanned simultaneously with the plurality of beam spots in a main scanning direction by a rotation of the rotary deflector, wherein the laser array is configured such that the light emitting parts are arrayed along a line that is at an inclination angle $\phi$ to the sub-scanning direction, the inclination angle $\phi$ measured in degrees and meeting the conditions $0 \leq \phi < 90$, and that a scanning line pitch P, an array pitch $\rho$ of the light emitting parts of the laser array and a parameter K defined by the equation $K=0.82 \lambda/\omega z$, where $\lambda$ is a wavelength of the emitted laser beams and $\omega z$ is a target beam spot diameter in the sub-scanning direction, satisfy the following conditions:

$$0.01 < K \cdot P/(\rho \cdot \cos \phi) < 0.30$$

$$0.011 < K < 0.030.$$

The above-mentioned objects of the present invention are achieved by a multi-beam scanning method that comprising the steps of: providing a semiconductor laser array having a plurality of light emitting parts emitting multiple laser beams; providing a rotary deflector deflecting the laser beams emitted by the light emitting parts of the semiconductor laser array; focusing the deflected laser beams from the rotary deflector onto a scanned surface to form a plurality of beam spots that are separated on the scanned surface in a sub-scanning direction; and scanning the scanned surface simultaneously with the plurality of beam spots in a main scanning direction by a rotation of the rotary deflector, wherein the laser array is configured such that the light emitting parts are arrayed along a line that is at an inclination angle $\phi$ to the sub-scanning direction, the inclination angle $\phi$ measured in degrees and meeting the conditions $0 \leq \phi < 90$, and that a scanning line pitch P, an array pitch $\rho$ of the light emitting parts of the laser array and a parameter K defined by the equation $K=0.82 \lambda/\omega z$, where $\lambda$ is a wavelength of the emitted laser beams and $\omega z$ is a target beam spot diameter in the sub-scanning direction, satisfy the following conditions:

$$0.01 < K \cdot P/(\rho \cdot \cos \phi) < 0.30$$

$$0.011 < K < 0.030.$$

The above-mentioned objects of the present invention are achieved by a light source device for use in a multi-beam scanning device, the light source device comprising: a semiconductor laser array which has a plurality of light emitting parts emitting multiple laser beams; a coupling lens which couples the laser beams emitted by the laser array; and an aperture stop which restricts a diameter of the laser beams passed through the coupling lens, wherein the multi-beam scanning device comprises: the light source device; a rotary deflector which deflects the laser beams emitted by the light emitting parts of the laser array; and a focusing optical system which focuses the deflected laser beams from the rotary deflector onto a scanned surface to form a plurality of beam spots that are separated on the scanned surface in a sub-scanning direction, the scanned surface being scanned simultaneously with the plurality of beam spots in a main scanning direction by a rotation of the rotary deflector, wherein the laser array is configured such that the light emitting parts are arrayed along a line that is at an inclination angle $\phi$ to the sub-scanning direction, the inclination angle $\phi$ measured in degrees and meeting the condition $0 \leq \phi < 90$, and that a scanning line pitch P, an array pitch $\rho$ of the light emitting parts of the laser array and a parameter K defined by the equation $K=0.82 \lambda/\omega z$, where $\lambda$ is a wavelength of the emitted laser beams and $\omega z$ is a target beam spot diameter in the sub-scanning direction, satisfy the following conditions:

$$0.01 < K \cdot P/(\rho \cdot \cos \phi) < 0.30$$

$$0.011 < K < 0.030$$

and wherein the aperture stop is configured to have a numerical aperture NAzS in the sub-scanning direction that satisfies the conditions: $0.01 < NAzS < 0.30$.

The above-mentioned objects of the present invention are achieved by an image forming apparatus in which a multi-beam scanning device is provided, the image forming apparatus forming an electrostatic latent image on a scanned surface of a photosensitive medium through an exposure of the photosensitive medium to an imaging light pattern provided by the multi-beam scanning device, the multi-beam scanning device including: a semiconductor laser array which has a plurality of light emitting parts emitting multiple laser beams; a rotary deflector which deflects the laser beams emitted by the light emitting parts of the semiconductor laser array; and a focusing optical system which focuses the deflected laser beams from the rotary deflector onto a scanned surface to form a plurality of beam spots that are separated on the scanned surface in a sub-scanning direction, the scanned surface being scanned simultaneously with the plurality of beam spots in a main scanning direction by a rotation of the rotary deflector, wherein the laser array is configured such that the light emitting parts are arrayed along a line that is at an inclination angle $\phi$ to the sub-scanning direction, the inclination angle $\phi$ measured in degrees and meeting the conditions $0 \leq \phi < 90$, and that a scanning line pitch P, an array pitch $\rho$ of the light emitting parts of the laser array and a parameter K defined by the equation $K=0.82 \lambda/\omega z$, where $\lambda$ is a wavelength of the emitted laser beams and $\omega z$ is a target beam spot diameter in the sub-scanning direction, satisfy the following conditions:

$$0.01 < K \cdot P/(\rho \cdot \cos \phi) < 0.30$$

$$0.011 < K < 0.030.$$

In the multi-beam scanning device and method of the present invention, the semiconductor laser array is used as the plurality of light sources and it is possible to ensure adequate depth clearance when the optical scanning is performed at a high density. The multi-beam scanning device and method of the present invention are effective in reducing the variations of the beam spots on the scanned surface, so that the multi-beam scanning is carried out with accurate beam spot diameter so as to create good quality of a reproduced image. Therefore, the image forming apparatus in which the multi-beam scanning device of the present invention is provided can create good quality of a reproduced image.

BRIEF DESCRIPTION OF THE DRAWINGS

Other objects, features and advantages of the present invention will be apparent from the following detailed description when read in conjunction with the accompanying drawings.

FIG. 14 is a diagram for explaining a configuration of the optical systems of a sixth preferred embodiment of the multi-beam scanning device.

DETAILED DESCRIPTION OF PREFERRED EMBODIMENTS

A description will be given of preferred embodiments of the multi-beam scanning device and the image forming apparatus of the present invention with reference to the accompanying drawings.

Figure 1:
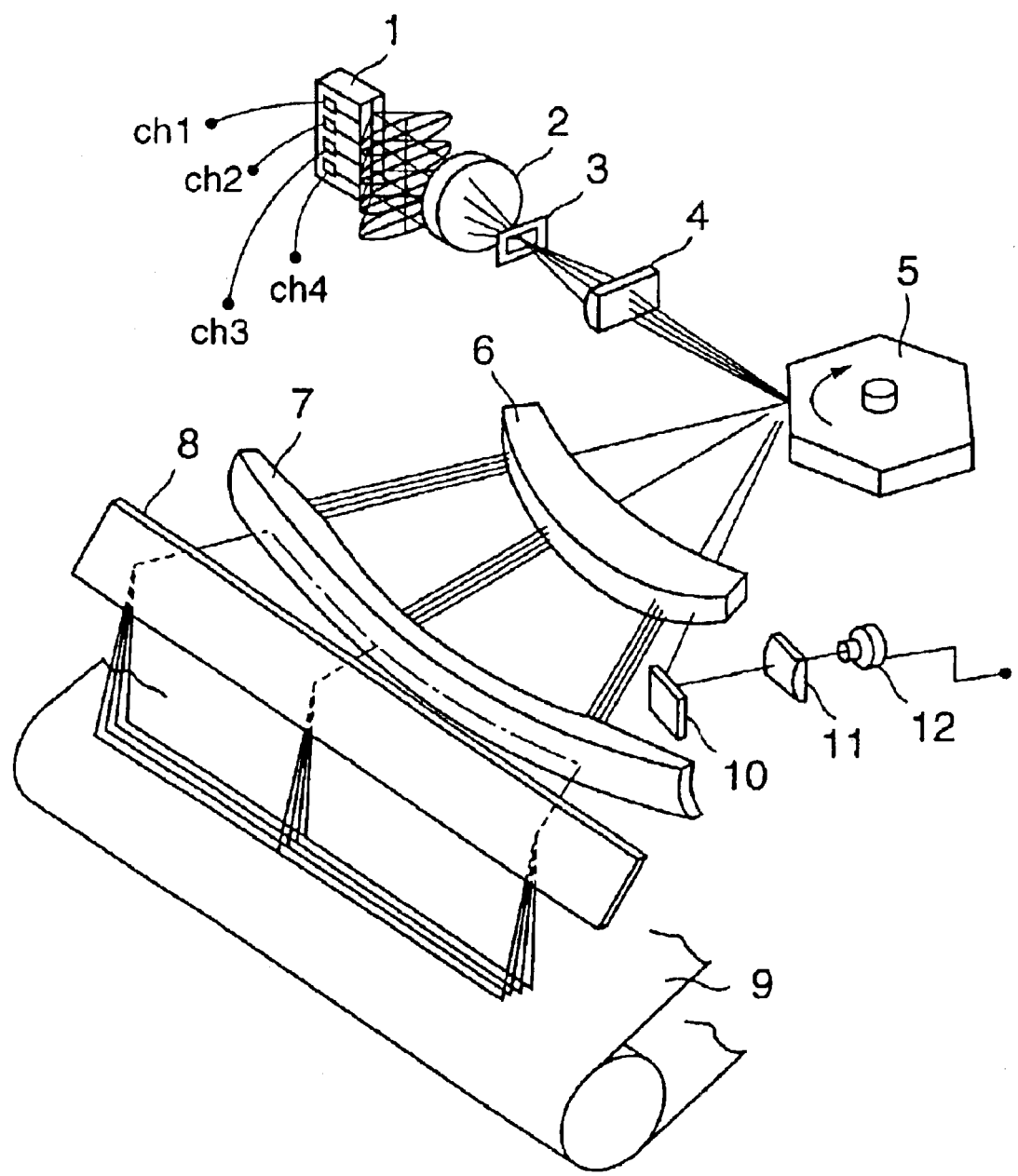
FIG. 1 is a perspective view of one preferred embodiment of the multi-beam scanning device of the present invention.

FIG. 1 is a perspective view of one preferred embodiment of the multi-beam scanning device of the present invention.

The multi-beam scanning device of the present embodiment is provided for use in an image forming apparatus, such as a laser printer, a digital copier or a laser facsimile. In the image forming apparatus, an image is formed on a scanned surface of a photosensitive medium when the photosensitive medium surface is scanned in a main scanning direction and a sub-scanning direction by the laser beams focused by the multi-beam scanning device.

Specifically, the multi-beam scanning device of the present embodiment is provided for use in an image forming apparatus that forms an image through an electrophotographic printing process. In the electrophotographic printing process, there are basically six major steps employed: (1) charging of the photosensitive medium; (2) exposing of the photosensitive medium to the imaging light pattern; (3) developing of the photosensitive medium with toner; (4) transferring of the toned image from the photosensitive medium to the final medium (usually paper); (5) thermal fusing of the toner to the paper; and (6) cleaning of residual toner from the photosensitive medium surface. The optical scanning of the photosensitive medium surface, which is performed by the laser beams from the multi-beam scanning device of the above-described embodiment, corresponds to the exposing step of the electrophotographic printing process that is carried out by the image forming apparatus.

As shown in FIG. 1, the multi-beam scanning device of the present embodiment generally comprises a semiconductor laser diode (or a light source unit) 1, a coupling lens 2, an aperture stop 3, a line focusing lens 4, a rotary polygonal mirror 5, an fθ lens 6, an elongated focusing lens 7, a reflector mirror 8, a photosensitive belt 9, and a sync monitoring detector. The sync monitoring device includes a mirror 10, a focusing lens 11 and a sync monitoring sensor 12. The sync monitoring sensor 12 is formed by, for example, a photodiode, and the sync monitoring sensor 12 converts the incident light beam into a sync signal that is indicative of a time the sync monitoring sensor 12 has received the light beam from the light source unit 1.

The light source device according to one embodiment of the present invention is constituted by the semiconductor laser array 1, the coupling lens 2, and the aperture stop 3 in the multi-beam scanning device of FIG. 1. The light source device may be configured into a single device that includes the elements 1, 2 and 3 of the multi-beam scanning device of FIG. 1.

In the multi-beam scanning device of FIG. 1, the semiconductor laser array I includes a plurality of light emitting parts that emit a plurality of divergent laser beams in accordance with an image signal (which carries imaging information). The laser beams from the semiconductor laser array 1 are directed to the coupling lens 2. The coupling lens 2 couples the laser beams emitted by the semiconductor laser array 1, and introduces the coupled laser beams into the aperture stop 3. The aperture stop 3 restricts the diameter of the incident laser beams to an appropriate level, and introduces the laser beams into the line focusing lens 4.

The line focusing lens 4 provides a refraction power to the laser beams, passed through the aperture stop 3, with respect to only the sub-scanning direction. The line focusing lens 4 is formed by, for example, a cylindrical lens. With the refraction power of the focusing lens 4, the laser beams from the aperture stop 4 form line images at an adjacent position of the rotary polygonal mirror 5, which are elongated in the main scanning direction and separated from each other in the sub-scanning direction.

The rotary polygonal mirror 5 in the present embodiment is a rotary deflector having reflection surfaces on the six peripheral sides. One of the reflection surfaces of the rotary polygonal mirror 5 deflects the laser beams from the focusing lens 4 while the rotary polygonal mirror 5 is rotated at a constant speed around its rotation axis in the rotation direction indicated by the arrow in FIG. 1, which allows the scanned surface to be scanned at a constant speed in the main scanning direction with the beam spots.

The deflected laser beams from the polygonal mirror 5 are passed through the fθ lens 6 and the elongated focusing lens 7, and the laser beams from the focusing lens 7 are reflected to the photosensitive belt 9 by the reflector mirror 8. The fθ lens 6 and the elongated focusing lens 7 form a focusing optical system in the multi-beam scanning device of the present embodiment. With the rotation of the rotary deflector 5, the laser beams from the reflector mirror 8 scan a scanned surface of the photosensitive belt 9 in the main scanning direction. This main scanning direction is parallel to the axial direction of a transport roller that is provided to rotate or transport the photosensitive belt 9 around the rotation axis of the transport roller.

In a synchronous manner with a time the main scanning is performed (or every time the laser beams from the rotary deflector 5 are incident to the sync monitoring device), the photosensitive belt 9 is rotated around the rotation axis of the transport roller by a given rotational angle. This causes the photosensitive medium surface to be scanned in the sub-scanning direction by the laser beams focused by the multi-beam scanning device. The sub-scanning direction, which is parallel to the direction in which the photosensitive belt 9 is transported, is perpendicular to the axial direction of the transport roller of the photosensitive belt 9. Therefore, the photosensitive medium surface is scanned in the main scanning direction and in the sub-scanning direction by the laser beams focused by the multi-beam scanning device. Each of the respective light emitting parts of the semiconductor laser array 1 is independently turned on and off in accordance with the image signal, and an electrostatic latent image is formed on the photosensitive medium surface as a result of the exposure of the photosensitive belt 9 to the imaging light pattern provided by the semiconductor laser array 1.

In the multi-beam scanning device of FIG. 1, the semiconductor laser array 1 includes the plurality of light-emitting parts that are independently turned on and off in accordance with the image signal. The laser beams emitted by the light emitting parts of the semiconductor laser array 1 are focused on the photosensitive medium surface so that the respective light spots are formed thereon. The photosensitive medium surface is scanned at a substantially constant speed in the main scanning direction by the laser beams, focused by the multi-beam scanning device, with the rotation of the rotary deflector 5.

The coupling lens 2 may be configured to convert the laser beams emitted by the semiconductor laser array 1 into substantially parallel laser beams. Alternatively, the coupling lens 2 may be configured to convert the laser beams emitted by the semiconductor laser array 1 into less divergent laser beams. Alternatively, the coupling lens 2 may be configured to convert the laser beams emitted by the semiconductor laser array 1 into convergent laser beams.

In the multi-beam scanning device of FIG. 1, the sync monitoring device is provided to synchronize the timing of a start of every main scanning of the photosensitive medium surface. As described above, every time the laser beams from the rotary deflector 5 are incident to the sync monitoring sensor 12, the sync monitoring sensor 12 outputs a sync signal, and this sync signal is used to start the main scanning of the multi-beam scanning device.

The sync monitoring device in the present embodiment includes the mirror 10, the focusing lens 11 and the sync monitoring sensor 12. The mirror 10 reflects the laser beams, which are sent by the rotary deflector 5 through the fθ lens 6, to the focusing lens 11. The focusing lens 11 converts the laser beams into convergent laser beams and introduces them into the sync monitoring sensor 12. The sync monitoring sensor 12 is formed by a photodiode or a charge-coupled device, and the sync monitoring sensor 12 outputs a sync signal upon the receiving of the laser beams from the rotary deflector 5. The photosensitive belt 9 is rotated around the rotation axis by the given rotational angle in synchronism with the sync signal output by the sync monitoring sensor 12.

In the multi-beam scanning device of FIG. 1, the semiconductor laser array 1 is provided as the light source unit that emits a plurality of laser beams. The semiconductor laser array 1 includes a plurality of light emitting parts "ch1" through "ch4" (in this embodiment, the number of the light emitting parts in the light source device is equal to 4), and these light emitting parts are arrayed along a line at equal distances. The semiconductor laser array 1 may be configured so that the light emitting parts "ch1" through "ch4" are arrayed at equal distances along a slanted line that is inclined at an angle $\phi$ ($\phi>0$) to the sub-scanning direction. Hereinafter, this angle $\phi$ will be called the inclination angle $\phi$.

Figure 2:
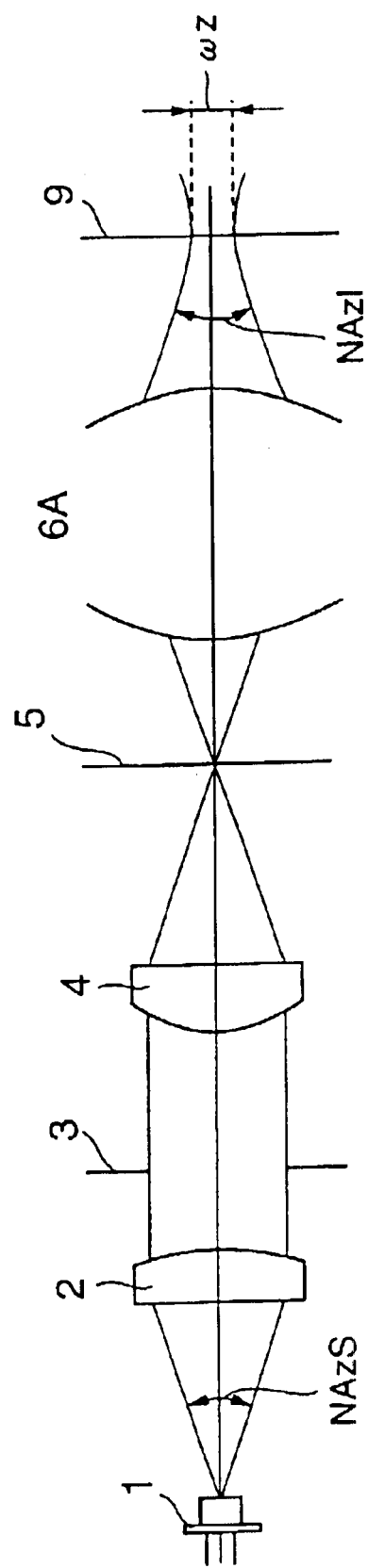
FIG. 2 is a diagram for explaining a sub-scanning-direction imaging pattern of a light beam between one of the light emitting parts of a light source unit and the scanned surface of a photosensitive medium.

FIG. 2 shows a sub-scanning-direction imaging pattern of the laser beam from one of the light emitting parts of the semiconductor laser array 1 to the scanned surface of the photosensitive belt 9.

In FIG. 2, the sub-scanning direction is parallel to the rotation axis of the rotary polygonal mirror 5, and the main scanning direction is perpendicular to the plane of FIG. 2.

In the imaging pattern of the laser beam shown in FIG. 2, the divergent laser beam is emitted by one of the light emitting parts "ch1" through "ch4" of the semiconductor laser array 1. The coupling lens 2 couples the laser beam emitted by the semiconductor laser array 1. The aperture stop 3 restricts the diameter of the incident laser beam to the appropriate level and introduces the laser beam into the focusing lens 4.

With the refraction power of the focusing lens 4, the laser beam from the aperture stop 4 forms a line image at the position adjacent to the rotary polygonal mirror 5, the line image being elongated in the main scanning direction. In the imaging pattern of FIG. 2, the line image formed by the focusing lens 4 is shown as a point on the reflection surface of the rotary polygonal mirror 5.

The reflection surface of the rotary polygonal mirror 5 deflects the laser beam from the focusing lens 4 while the rotary polygonal mirror 5 is rotated at a constant speed around its rotation axis in the rotating direction (indicated by the arrow in FIG. 1).

The deflected laser beam from the rotary polygonal mirror 5 is passed through the focusing optical system (which is indicated by reference numeral 6A in FIG. 2) that includes the fθ lens 6 and the elongated focusing lens 7, and the laser beam from the focusing optical system 6A is reflected to the surface of the photosensitive belt 9 by the reflector mirror 8.

With the focusing action of the focusing optical system 6A, the laser beam from the focusing optical system 6A forms a beam spot on the surface of the photosensitive belt 9, the beam spot having a diameter ωz in the sub-scanning direction.

In the imaging pattern of FIG. 2, suppose that the aperture stop 3, which restricts the diameter of the laser beam from the coupling lens 2, is configured to have a source-side numerical aperture "NAzS" with respect to the sub-scanning direction and the focusing optical system 6A, facing the scanned surface of the photosensitive belt 9, is configured to have an image-side numerical aperture "NAzI" with respect to the sub-scanning direction.

The multi-beam scanning device of the present embodiment is configured such that the beam spot diameter ωz in the sub-scanning direction is represented by the following formula:

$$\omega z = 0.82 \, \lambda / NAzI \qquad (1)$$

where λ is a wavelength of the laser beam emitted by the semiconductor laser array 1, and NAzI is a numerical aperture of the focusing optical system 6A with respect to the sub-scanning direction.

FIG. 3A, FIG. 3B, FIG. 3C and FIG. 3D are diagrams for explaining a relationship between the semiconductor laser array 1, the aperture stop 3 and the far-field pattern.

Figure 3A:
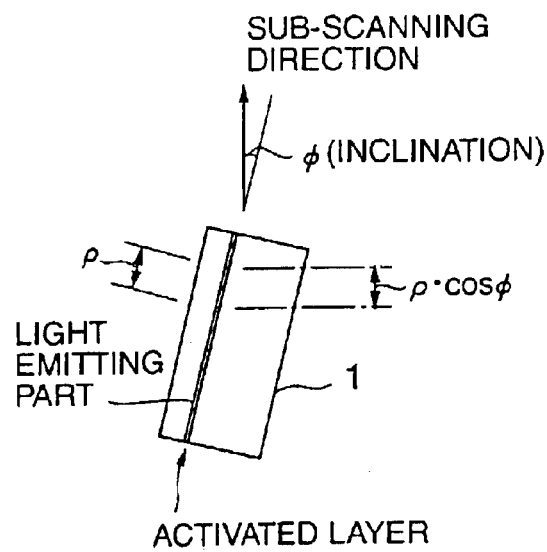
FIG. 3A, FIG. 3B, FIG. 3C and FIG. 3D are diagrams for explaining a relationship between the semiconductor laser array, the aperture stop, and the far-field pattern.

FIG. 3A shows a configuration of the semiconductor laser array 1 of the present embodiment. As shown in FIG. 3A, the semiconductor laser array 1 is configured such that the light emitting parts (which correspond to the light emitting parts "ch1" through "ch4" in FIG. 1) are arrayed along a slanted line that is at an inclination angle φ to the sub-scanning direction of the laser beam incident to the scanned surface of the photosensitive medium. The inclination angle φ is measured in degrees and meets the conditions 0≦φ<90.

As shown in FIG. 3A, in the present embodiment, a sub-scanning-direction array pitch of the light emitting parts in the semiconductor laser array 1, measured along the vertical line parallel to the sub-scanning direction, is represented by "ρ·cos φ" where ρ is an array pitch of the light emitting parts of the laser array 1 along the slanted line and φ is the inclination angle of the light emitting parts of the semiconductor laser array 1.

In the present embodiment, a scanning line pitch P, which is a distance between the main scanning lines on the scanned surface of the photosensitive medium 9, is determined by an optical writing density (measured in "dpi", or dots per inch) of the multi-beam scanning device. Suppose that the optical systems between the laser array 1 and the scanned surface of the photosensitive medium 9 have a composite focusing factor βz in the sub-scanning direction.

In the multi-beam scanning device of the present embodiment, it is necessary to meet the following equation:

$$\beta z = P/(\rho \cdot \cos \phi) \qquad (2)$$

Suppose that the aperture stop 3 has the source-side numerical aperture NAzS with respect to the sub-scanning direction and the focusing optical system 6A has the image-side numerical aperture NAzI with respect to the sub-scanning direction, as shown in FIG. 2. The multi-beam scanning device of the present embodiment meets the following equation:

$$NAzS = \beta z \, NAzI \qquad (3)$$

Substituting the equations (1) and (2) into the equation (3) yields the following equation:

$$NAzS = \{P/(\rho \cdot \cos \phi)\}\{0.82 \, \lambda/\omega z\} \qquad (4)$$

Suppose that a parameter K is defined by the equation: K=0.82 λ/ωz, where λ is a wavelength of the emitted laser beams and ωz is a target beam spot diameter in the sub-scanning direction. The above equation (4) is rewritten into the following equation:

$$NAzS = K \cdot P/(\rho \cdot \cos \Phi) \qquad (4')$$

As is apparent from the FIG. 2, the aperture stop 3 is configured to have the source-side numerical aperture NAzS with respect to the sub-scanning direction.

If the numerical aperture NAzS of the aperture stop 3 is not properly set, the multi-beam scanning device will have the following problems. When the aperture stop 3 is configured to have a too small numerical aperture NAzS, the multi-beam scanning device is difficult to perform a high-speed optical scanning due to insufficient light energy. On the other hand, when the aperture stop 3 is configured to have a too large numerical aperture NAzS, the multi-beam scanning device is liable to variations of the divergence angle for each of the respective beam spots on the scanned surface.

In the multi-beam scanning device of the present embodiment, the value of the parameter K(=0.82 λ/ωz) is determined by the wavelength λ of the emitted laser beams and the target beam spot diameter ωz in the sub-scanning direction. The value of the parameter K is related to the above-described depth clearance in the sub-scanning direction.

Suppose that the wavelength λ ranges from 400 nm to 800 nm and the target beam spot diameter ωz ranges from 16 μm to 160 μm. The following table is the results of calculations of the parameter K and the depth clearance W corresponding to such values of the wavelength λ and the target beam spot diameter ωz.

| λ (nm) | ωz (μm) | K | W (mm) |
|---|---|---|---|
| 800 | 22 | 0.0298 | 0.90 |
| 800 | 50 | 0.0131 | 4.65 |
| 800 | 60 | 0.0109 | 6.69 |
| 780 | 22 | 0.0291 | 0.92 |
| 780 | 30 | 0.0213 | 1.72 |
| 780 | 50 | 0.0128 | 4.77 |
| 400 | 16 | 0.0205 | 0.95 |
| 400 | 30 | 0.0109 | 3.35 |

It is known from practical experience that the depth clearance W that is above 0.9 mm is needed to eliminate the component part errors or the assembly errors. Accordingly, as long as the supposition that the wavelength λ ranges from 400 nm to 800 nm and the target beam spot diameter ωz ranges from 16 μm to 160 μm is made, the multi-beam scanning device of the present embodiment is configured such that the parameter K satisfies the following conditions:

$$0.011 < K < 0.030 \qquad (5)$$

The upper limit of the source-side numerical aperture NAzS must be determined by taking into consideration the elimination of the variations of the divergence angle for each of the respective beam spots on the scanned surface.

Figure 3B:
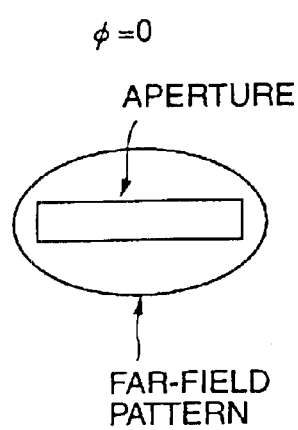
Figure 3C:
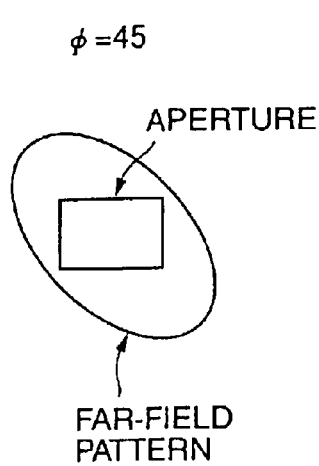
Figure 3D:
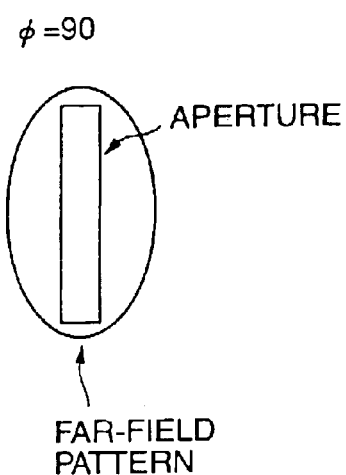

FIG. 3B, FIG. 3C and FIG. 3D respectively show the relationship between the laser beam condition at the aperture stop 3 and the far-field pattern when the inclination angle φ is equal to 0, 45 and 90 degrees.

The divergence angle $\phi$ of the divergent laser beam emitted from the light emitting part of the laser array 1 when the beam power is above ½ of the peak value of the power distribution is larger than at least 20 degrees. As shown in FIG. 3B through FIG. 3D, in a case of the inclination angle $\phi=0$ (FIG. 3B), the divergence angle $\theta$ in the sub-scanning direction is minimum.

Accordingly, the multi-beam scanning device of the present embodiment is configured such that the numerical aperture NAzS of the aperture stop 3 satisfies the following condition:

$$NAzS \leq \sin[\tan^{-1}\{\sqrt{(2/\ln 2)\tan(\theta/2)}\}] \tag{6}$$

When the divergence angle $\theta$ is equal to 20 degrees, the above formula (6) is written into $$NAzS \leq 0.30 \tag{6'}$$

In practical applications, the multi-beam scanning device may be configured to satisfy the above condition (6').

The lower limit of the source-side numerical aperture NAzS must be determined by taking into consideration the composite focusing factor $\beta z$ of the optical systems between the laser array 1 and the scanned surface 9 in the sub-scanning direction. Specifically, this composite focusing factor $\beta z$ is calculated by a product of a lateral magnification factor $|\beta 1|$ of the optical systems (the coupling lens 2 and the cylindrical lens 4) between the laser array 1 and the rotary deflector 5 in the sub-scanning direction and a lateral magnification factor $|\beta 2|$ of the optical systems (the f$\theta$ lens 6 and the elongated focusing lens 7) of the focusing optical system 6A in the sub-scanning direction. Namely, the composite focusing factor $\beta z$ of the optical systems between the laser array 1 and the scanned surface 9 in the sub-scanning direction is calculated in accordance with the equation $\beta z=|\beta 1|\cdot|\beta 2|$.

It is known from practical experience that the lower limit of $|\beta 1|$ is above 1.8. Namely, $|\beta 1|\geq 1.8$. When $|\beta 1|<1.8$, the location of the cylindrical lens 4 is too close to the rotary deflector 5, and it is difficult to install the cylindrical lens 4 and the rotary deflector 5 with no interference. To avoid the interference between the cylindrical lens 4 and the rotary deflector 5 and ensure an adequate lateral magnification factor, it is necessary to enlarge the distance of the coupling lens 2 and the laser array 1. However, if the distance is enlarged, the coupling lens 2 can couple only a very small light quantity of the laser beams from the laser array 1 and the multi-beam scanning device is liable to insufficient light energy.

Further, it is known from practical experience that the effective range of the lateral magnification factor $|\beta 2|$ of the optical systems of the focusing optical system 6A in the sub-scanning direction is $0.5\leq|\beta 2|\leq 2.0$. When $|\beta 2|23\ 0.5$, installing the focusing lens 7 at a position that is very close to the scanned surface 9 is required. The length of the focusing lens 7 in the main scanning direction must be increased and the manufacturing process of such focusing lens 7 becomes expensive. When $|\beta 2|\geq 2.0$, the variations of the image surface position caused by the assembly errors or the like are increased, which causes the multi-beam scanning device to be difficult to perform the multi-beam scanning at a higher density above 600 dpi.

From the foregoing considerations, the lower limit of the composite focusing factor $\beta z(=|\beta 1|\cdot|\beta 2|)$ is determined as being about $0.9(=1.8\times 0.5)$.

From the above formulas (2) and (4'), the equation $NAzS=\beta z\cdot K$ is obtained. As the lower limit of the parameter K is 0.011, the source-side numerical aperture NAzS of the aperture stop 3 must satisfy the following condition:

$$NAzS \geq 0.01 \tag{7}$$

From the above formulas (6') and (7), $$0.01 \leq NAzS \leq 0.30 \tag{8}$$

By using the above equation (4'): $NAzS=K\cdot P/(\rho\cdot\cos\phi)$, $$0.01 < K\cdot P/(\rho\cdot\cos\phi) < 0.30 \tag{9}$$

Accordingly, the multi-beam scanning device of the present embodiment is configured such that the above conditions (9) are satisfied.

Suppose that the wavelength $\lambda$ ranges from 400 nm to 800 nm and the target beam spot diameter $\omega z$ is set to 30 $\mu$m. The following table is the results of calculations of the parameter K and the depth clearance W corresponding to such values of the wavelength $\lambda$ and the target beam spot diameter $\omega z$.

| $\lambda$ (nm) | $\omega z$ ($\mu$m) | K | W (mm) |
| --- | --- | --- | --- |
| 800 | 30 | 0.022 | 1.67 |
| 780 | 30 | 0.021 | 1.72 |
| 700 | 30 | 0.019 | 1.91 |
| 600 | 30 | 0.016 | 2.23 |
| 550 | 30 | 0.015 | 2.43 |
| 500 | 30 | 0.014 | 2.68 |
| 450 | 30 | 0.012 | 2.97 |
| 400 | 30 | 0.011 | 3.35 |

It is readily understood from the above table that, when the target beam spot diameter $\omega z$ is set to the same value (30 $\mu$m), the smaller the wavelength $\lambda$, the larger the depth clearance W. When the wavelength $\lambda$ is set to a small value, the depth clearance W becomes large and the accuracy requirements of the optical systems become easy to satisfy. Therefore, it is possible to make the multi-beam scanning device of the present embodiment inexpensive. Further, when the wavelength $\lambda$ is set to a small value, the numerical aperture NAzS can be set to a small value. Hence, the multi-beam scanning device of the present embodiment is effective in eliminating the variations of the divergence angle.

From the forgoing considerations, it is preferred that the multi-beam scanning device of the present embodiment is configured such that the wavelength $\lambda$ of the emitted laser beams is below 700 nm.

As described above with reference to FIG. 1 and FIG. 2, in the multi-beam scanning device of the present embodiment, the semiconductor laser array 1 is configured such that the light emitting parts are arrayed along a line that is at the inclination angle $\phi$ to the sub-scanning direction, the inclination angle $\phi$ measured in degrees and meeting the conditions $0\leq\phi<90$, and that the scanning line pitch P, the array pitch$\rho$ of the light emitting parts of the laser array 1 and the parameter K defined by the equation $K=0.82\ \lambda/\omega z$, where $\lambda$ is the wavelength of the emitted laser beams and $\omega z$ is the target beam spot diameter in the sub-scanning direction, satisfy the following conditions:

$$0.01 < K\cdot P/(\rho\cdot\cos\phi) < 0.30 \tag{9}$$

$$0.011 < K < 0.030 \tag{5}$$

According to the above configuration, the multi-beam scanning device and method of the present embodiment can achieve the depth clearance that is above 0.9 mm. Therefore, it is possible to ensure adequate depth clearance when the optical scanning is performed at a high density. The multi-beam scanning device and method of the present embodiment are effective in reducing the variations of the beam spots on the scanned surface, so that the multi-beam scanning is carried out with accurate beam spot diameter so as to create good quality of a reproduced image. Therefore, the image forming apparatus in which the multi-beam scanning device of the present invention is provided can create good quality of a reproduced image.

Further, in the multi-beam scanning device of the present embodiment according to the above configuration, the coupling lens 2 couples the laser beams emitted by the laser array 1. The aperture stop 3 restricts the diameter of the laser beams passed through the coupling lens 2. The line focusing lens 4 provides a refraction power to the laser beams, passed through the aperture stop 3, with respect to only the sub-scanning direction. The rotary deflector 5 includes the reflection surfaces, the rotary deflector 5 deflects the laser beams from the laser array 1 by one of the reflection surfaces. The focusing optical system 6A focuses the deflected laser beams from the rotary deflector 5 onto the scanned surface 9 to form the beam spots thereon.

Further, the light source device of the present embodiment for use in the multi-beam scanning device according to the above configuration, includes the semiconductor laser array 1, the coupling lens 2 and the aperture stop 3, wherein the aperture stop is configured to have a numerical aperture NAzS in the sub-scanning direction that satisfies the conditions:

$$0.01 < NAzS < 0.30 \tag{3}$$

Next, a description will be given of first through sixth preferred embodiments of the multi-beam scanning device of the invention with reference to the accompanying drawings FIG. 4 through FIG. 15B.

In some of the following preferred embodiments, one or a plurality of lenses having a non-spherical configuration may be provided in the focusing optical system 6A. First, a description will be provided of the non-spherical configuration of such lenses. However, the present invention is not limited to the non-spherical configuration of such lenses, which will be described below.

A non-circular configuration of a lens of the focusing optical system 6A, which is taken along a main-scanning cross-section (which is a flat cross-sectional plane containing the optical axis and being parallel to the main scanning direction), is expressed as follows.

Suppose that "X" indicates a depth in the optical axis direction, "Y" indicates a coordinate in the main scanning direction, "Rm" indicates a radius of a paraxial curvature within the main-scanning cross-section, and "Km" and "Ai" (i=1, 2, 3, . . . ) indicate main-scanning coefficients. The depth X in the optical axis direction is represented by the following equation:

$$X = (Y^2/R_m)/\left[1 + \sqrt{\{(1 + K_m)(Y/R_m)^2\}}\right] + \sum A_i Y^i \tag{10}$$

When a curvature within a sub-scanning cross-section (is a flat cross-sectional plane perpendicular to the main scanning direction) is varied depending on the coordinate Y within the sub-scanning cross-section in the main scanning direction, the curvature Cs(Y) is represented by the following equation:

$$Cs(Y) = \{1/Rs(0)\} + \Sigma B_i Y^i \tag{11}$$

where "Rs(0)" indicates a radius of a paraxial curvature within the sub-scanning cross-section at Y=0, "Bi" indicates sub-scanning coefficients, and "i" indicates an integer (i=1, 2, 3, . . . ).

Next, the expression of a non-circular configuration of a lens of the focusing optical system 6A will be considered for a case in which the configuration of the lens within the main-scanning cross-section is non-circular, the configuration of the lens within the sub-scanning cross-section is non-circular, and the non-circular configuration of the lens within the sub-scanning cross-section is varied depending on the coordinate "Y" in the main-scanning direction. Suppose that "Z" indicates a coordinate in the sub-scanning direction. The depth X in the optical axis direction in this case is represented by the following equation:

$$\begin{aligned}
X = &(Y^2/R_m)/\left[1 + \sqrt{\{(1 + K_m)(Y/R_m)^2\}}\right] + \sum A_i Y^i + \\
&C_s(Y) \cdot Z^2 / \left[1 + \sqrt{\{(1 + K_s)(C_s(Y) \cdot Z)^2\}}\right] + \\
&(F_0 + F_1 \cdot Y + F_2 \cdot Y^2 + F_3 \cdot Y^3 + F_4 \cdot Y^4 + \cdots) \cdot Z + \\
&(G_0 + G_1 \cdot Y + G_2 \cdot Y^2 + G_3 \cdot Y^3 + G_4 \cdot Y^4 + \cdots) \cdot Z^2 + \\
&(H_0 + H_1 \cdot Y + H_2 \cdot Y^2 + H_3 \cdot Y^3 + H_4 \cdot Y^4 + \cdots) \cdot Z^3 + \\
&(I_0 + I_1 \cdot Y + I_2 \cdot Y^2 + I_3 \cdot Y^3 + I_4 \cdot Y^4 + \cdots) \cdot Z^4 + \\
&(J_0 + J_1 \cdot Y + J_2 \cdot Y^2 + J_3 \cdot Y^3 + J_4 \cdot Y^4 + \cdots) \cdot Z^5 + \\
&(K_0 + K_1 \cdot Y + K_2 \cdot Y^2 + K_3 \cdot Y^3 + K_4 \cdot Y^4 + \cdots) \cdot Z^6 + \\
&(L_0 + L_1 \cdot Y + L_2 \cdot Y^2 + L_3 \cdot Y^3 + L_4 \cdot Y^4 + \cdots) \cdot Z^7 + \\
&(M_0 + M_1 \cdot Y + M_2 \cdot Y^2 + M_3 \cdot Y^3 + M_4 \cdot Y^4 + \cdots) \cdot Z^8 + \\
&(N_0 + N_1 \cdot Y + N_2 \cdot Y^2 + N_3 \cdot Y^3 + N_4 \cdot Y^4 + \cdots) \cdot Z^9 + \ldots
\end{aligned} \tag{12}$$

where the coefficient "Ks" included in the third term of the equation (12) is represented by the equation $$Ks(Y) = Ks(0) + Ci\ Y^i \tag{13}$$

where "Ks(0)" indicates a conical coefficient within the sub-scanning cross-section at Y=0, "Ci" indicates sub-scanning coefficients, and "i" indicates an integer (i=1, 2, 3, . . . ).

Figure 4:
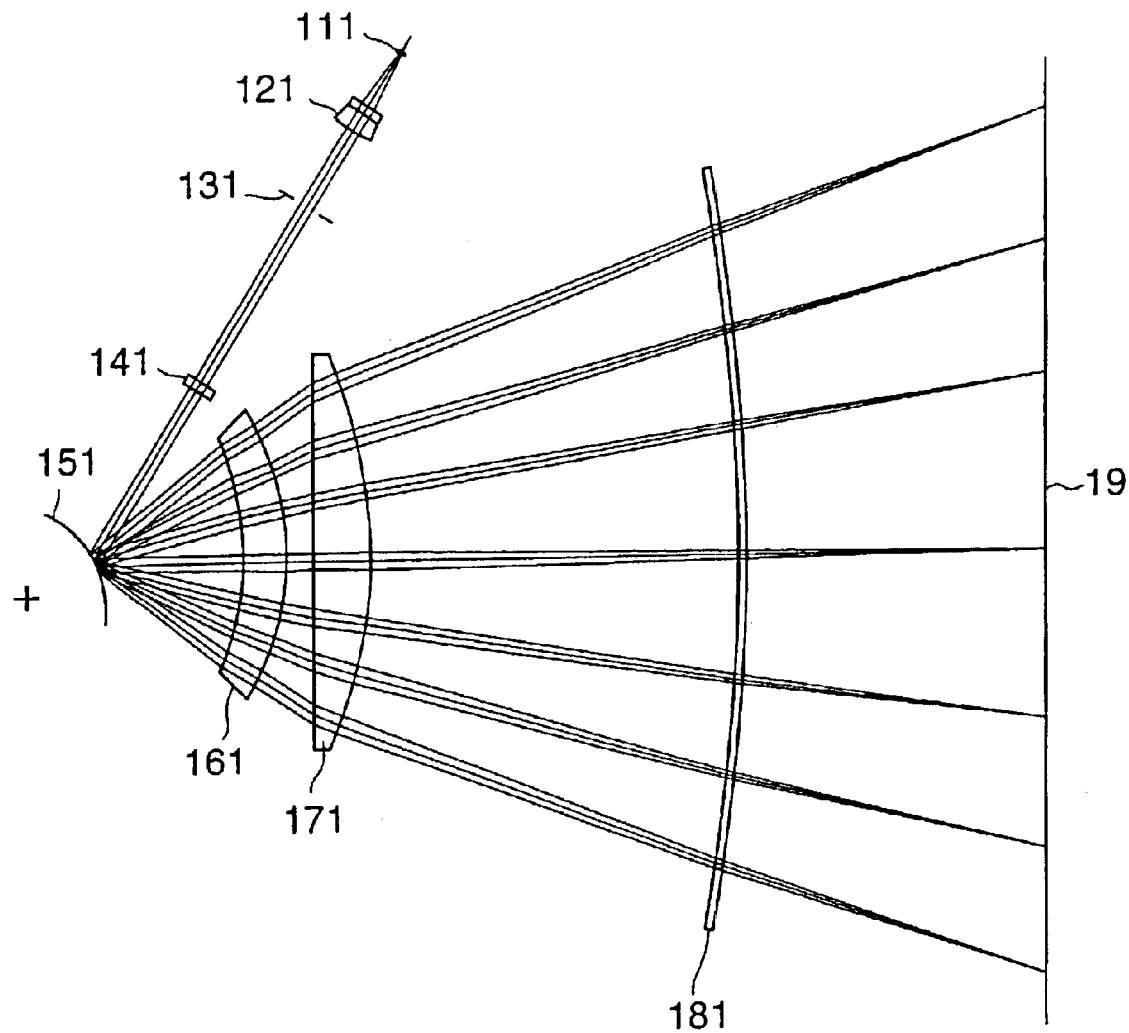
FIG. 4 is a diagram for explaining a configuration of the optical systems of a first preferred embodiment of the multi-beam scanning device.

FIG. 4 shows a configuration of the optical systems of a first preferred embodiment of the multi-beam scanning device.

As shown in FIG. 4, the multi-beam scanning device of this embodiment generally comprises a semiconductor laser array 111, a coupling lens 121, an aperture stop 131, a cylindrical lens 141, a rotary polygonal mirror 151, lenses 161, 171 and 181 of the focusing optical system, and a scanned surface 19 of the photosensitive medium.

It is a matter of course that a planer mirror may be provided at an intermediate portion of the optical path between the light source 111 and the scanned surface 19 to bend the optical path in conformity with the practical layout of the multi-beam scanning device.

In the configuration of FIG. 4, the semiconductor laser array 111 is provided with four light emitting parts, the array pitch ρ of the light emitting parts ρ=14 μm, the emitted laser beam wavelength 780 nm, the maximum output power 15 mW, and the inclination angle φ=0 degrees.

The coupling lens 121 is provided with a one-group, two-lens configuration, the focal length 30 mm, and the collimating function.

The cylindrical lens 141 is provided with the focal length 70.62 mm in the sub-scanning direction.

The aperture stop 131 is provided with the aperture width 5.2 mm in the main scanning direction and the aperture width 1.04 mm in the sub-scanning direction.

The rotary polygonal mirror 151 is provided with six reflection surfaces, the inscribed circle radius 25 mm, the incident angle (between the laser beam incident direction of the light source and the optical axis of the focusing optical system) 60 degrees, the writing density 1200 dpi, and the target beam spot diameter 50 µm.

The lenses 161, 171 and 181 of the focusing optical system are configured as in the following table. Suppose that "Rmi" indicates the radius of curvature of the i-th surface (counted from the side of the rotary polygonal mirror) within the main-scanning cross-section, "Rsi" indicates the radius of curvature of the i-th surface within the sub-scanning cross-section, "X" indicates the distance between the surfaces, "Y" indicates the shift amount of the surface in the upward direction in the plane of the shown configuration, and "n" indicates the refractive index. In the case of a lens having a non-circular configuration, the radius "Rmi" and the radius "Rsi" indicates the radius of the paraxial curvature of the i-th surface of such configuration. The notation of the following table is applied to other preferred embodiments which will be described later.

|  | i | Rmi | Rsi | X | Y | n |
|---|---|---|---|---|---|---|
| Mirror Surface | 0 | ∞ | ∞ | 51.38 | 1.627 | |
| Lens 161 | 1 | −96.76 | spherical | 15.07 | 0 | 1.78571 |
| | 2 | −93.27 | spherical | 9.76 | 0 | |
| Lens 171 | 3 | −2450.2 | spherical | 19.90 | 0 | 1.60909 |
| | 4 | −161.76 | spherical | 127.0 | 0 | |
| Lens 181 | 5 | −630.00 | −55.53 | 3.00 | 0 | 1.57211 |
| | 6 | −700.00 | −24.42 | 101.72 | 0 | |

The incident-side surface of the lens 181 (with the surface number i=5) has the main-scanning cross-section in the non-circular configuration. The non-circular configuration of this surface taken along the main-scanning cross-section is represented by the above equation (10). The following TABLE 1 provides the values of the main-scanning coefficients of the equation (10).

TABLE 1

| Surface No. | Main-Scanning Coefficients | |
|---|---|---|
| 5 | K | −31.405 |
| | $A_4$ | $-2.059 \times 10^{-9}$ |
| | $A_6$ | $1.839 \times 10^{-14}$ |
| | $A_8$ | $6.366 \times 10^{-18}$ |
| | $A_{10}$ | $-8.922 \times 10^{-22}$ |
| | $A_{12}$ | $6.466 \times 10^{-26}$ |
| | $A_{14}$ | $-1.339 \times 10^{-30}$ |
| | $A_{16}$ | $-1.058 \times 10^{-34}$ |
| | $A_{18}$ | $4.413 \times 10^{-39}$ |

In the first preferred embodiment, the multi-beam scanning device is configured to have the parameter K which is given by $$K = 0.82 \times 780 \times 10^{-3}/50 = 0.01279.$$

The configuration of this embodiment meets the conditions of the above formula (5). In the first preferred embodiment, the multi-beam scanning device is configured to have the parameter K·P/(ρ·cos φ) which is given by $$K \cdot P/(\rho \cdot \cos\phi) = 0.01279 \times 21.167/14$$
$$= 0.01934.$$

The configuration of this embodiment meets the conditions of the above formula (9).

Figure 5A:
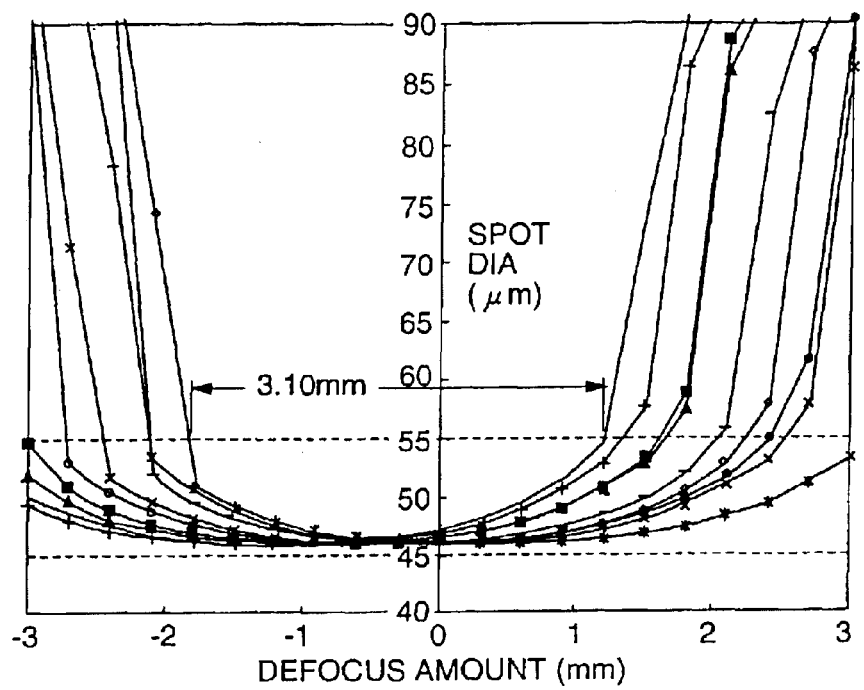
FIG. 5A and FIG. 5B are diagrams for explaining the relationship between the defocus amount and the spot diameter in the multi-beam scanning device of FIG. 4.
Figure 5B:
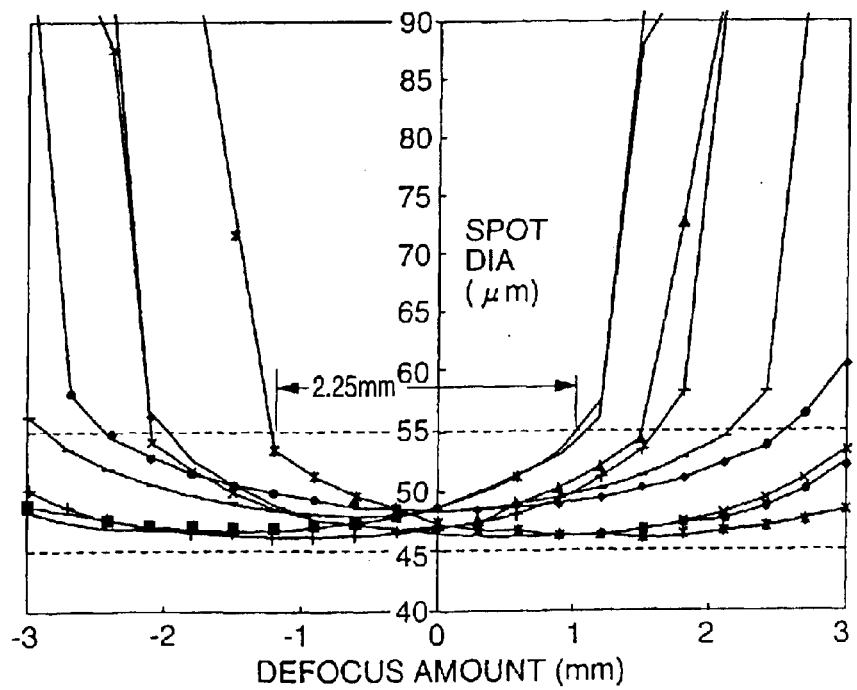

FIG. 5A and FIG. 5B are diagrams for explaining the relationship between the defocus amount and the spot diameter in the multi-beam scanning device of FIG. 4.

In the first preferred embodiment, the light emitting part "ch1" of the semiconductor laser array is positioned 21 µm apart from the optical axis of the coupling lens 121 in the sub-scanning direction. With respect to the defocus amount of the beam spot (which is formed on the scanned surface by the laser beam emitted from the light emitting part "ch1") at image-height positions of nine equal subdivisions of ±150 mm, the relationship between the defocus amount and the beam spot diameter in the main scanning direction is shown in FIG. 5A. Similarly, the relationship between the defocus amount and the beam spot diameter in the sub-scanning direction is shown in FIG. 5B.

As shown in FIG. 5A, the depth clearance in the main scanning direction is 3.10 mm. As shown in FIG. 5B, the depth clearance in the sub-scanning direction is 2.25 mm. As both the depth clearances of this embodiment are larger than 0.9 mm (based on the practical experience), the multi-beam scanning device of this embodiment ensures adequate depth clearance even when the optical scanning is performed at the writing density of 1200 dpi, and effectively reduces the variations of the beam spots on the scanned surface to the small level so that the multi-beam scanning is carried out with accurate beam spot diameter.

The numerical aperture NAzS of this embodiment is 0.01934. It is confirmed that the variations of the divergence angle for the respective light emitting parts of the semiconductor laser array are effectively reduced. When a photoconductive material having the exposure energy of 4.4 mJ/m$^2$ is used as the photosensitive medium in this embodiment, the threshold level of the exposure energy at the scanning speed 380.8 m/sec is 11.44 mW. As the maximum output power of the laser array in this embodiment is 15 mW, the insufficient light energy as in the conventional multi-beam scanning device does not occur for the present embodiment.

Figure 6:
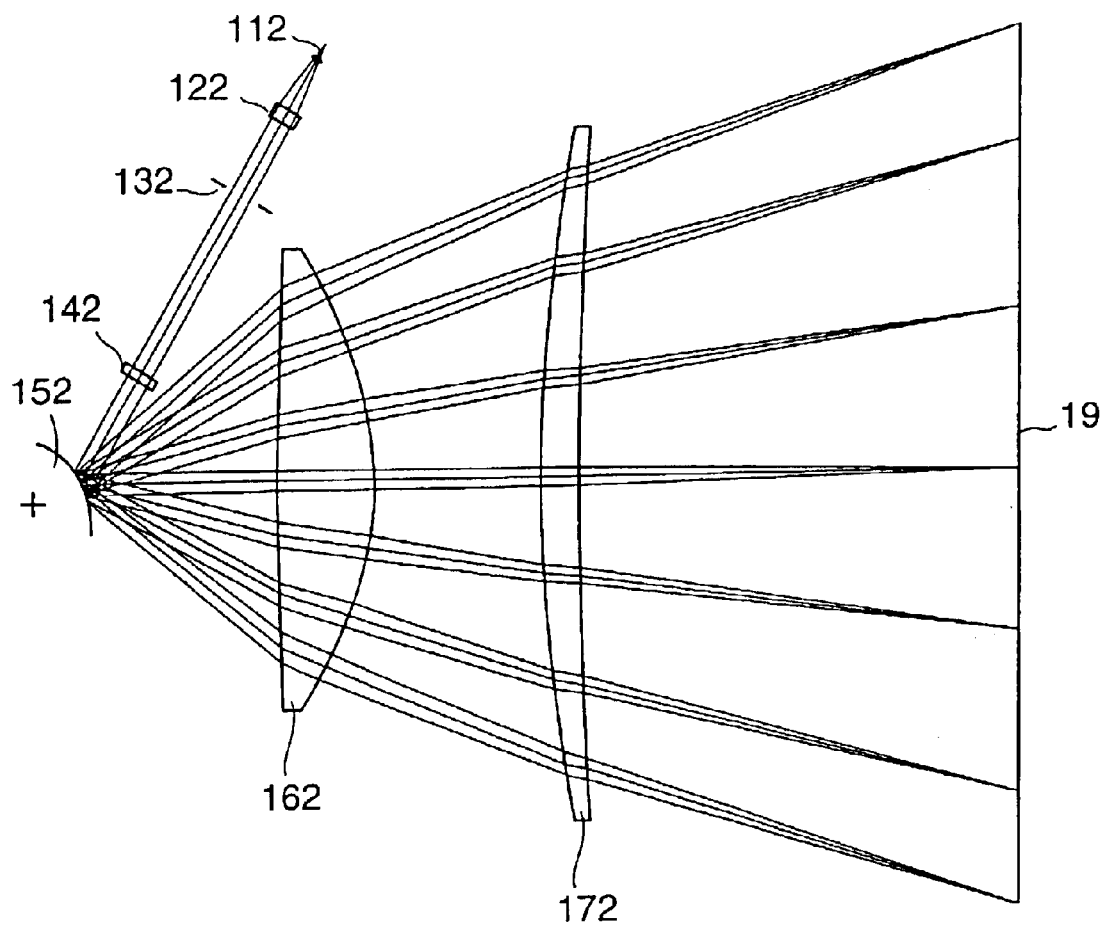
FIG. 6 is a diagram for explaining a configuration of the optical systems of a second preferred embodiment of the multi-beam scanning device.

Next, FIG. 6 shows a configuration of the optical systems of a second preferred embodiment of the multi-beam scanning device.

As shown in FIG. 6, the multi-beam scanning device of this embodiment generally comprises a semiconductor laser array 112, a coupling lens 122, an aperture stop 132, a cylindrical lens 142, a rotary polygonal mirror 152, lenses 162 and 172 of the focusing optical system, and the scanned surface 19 of the photosensitive medium.

It is a matter of course that a planer mirror may be provided at an intermediate portion of the optical path between the light source 112 and the scanned surface 19 to bend the optical path in conformity with the practical layout of the multi-beam scanning device.

In the configuration of FIG. 6, the semiconductor laser array 112 is provided with four light emitting parts, the array pitch ρ of the light emitting parts ρ=20 µm, the emitted laser beam wavelength 670 nm, the maximum output power 8 mW, and the inclination angle φ=29.45 degrees.

The coupling lens 122 is provided with a single lens configuration, the focal length 30 mm, and the collimating function.

The cylindrical lens 142 is provided with the focal length 51.88 mm in the sub-scanning direction.

The aperture stop 132 is provided with the aperture width 7.9 mm in the main scanning direction and the aperture width 1.2 mm in the sub-scanning direction.

The rotary polygonal mirror 152 is provided with five reflection surfaces, the inscribed circle radius 18 mm, the incident angle (between the laser beam incident direction of the light source and the optical axis of the focusing optical system) 60 degrees, the writing density 1200 dpi, and the target beam spot diameter 30 μm.

The lenses 162 and 172 of the focusing optical system are configured as in the following table.

|  | i | Rmi | Rsi | X | Y | n |
|---|---|---|---|---|---|---|
| Mirror Surface | 0 | ∞ | ∞ | 72.49 | 0.206 |  |
| Lens 162 | 1 | 1617.54 | −52.00 | 35.00 | 0 | 1.52657 |
|  | 2 | −146.53 | −195.27 | 62.91 | 0.204 |  |
| Lens 172 | 3 | 413.68 | −71.31 | 13.94 | 0 | 1.52657 |
|  | 4 | 824.88 | −27.70 | 160.22 | 0 |  |

The surfaces (the surface number i=1, 2, 3) of the lenses 162 and 172 have the non-circular configuration represented by the above equations (10) and (11). The surface (the surface number i=4) of the lens 172 has the non-circular configuration represented by the above equations (11) through (13). The following TABLE 2 through TABLE 6 provide the values of the main-scanning coefficients and the sub-scanning coefficients of the equations (10) through (13).

TABLE 2

| Surface Number | Main-Scanning Coefficients | | Sub-Scanning Coefficients | |
|---|---|---|---|---|
| 1 | K | 185 | $B_1$ | $-1.069 \times 10^{-5}$ |
|  | $A_1$ | 0 | $B_2$ | $2.323 \times 10^{-6}$ |
|  | $A_2$ | 0 | $B_3$ | $2.768 \times 10^{-9}$ |
|  | $A_3$ | 0 | $B_4$ | $-2.010 \times 10^{-10}$ |
|  | $A_4$ | $1.284 \times 10^{-8}$ | $B_5$ | $-5.286 \times 10^{-13}$ |
|  | $A_5$ | 0 | $B_6$ | $1.603 \times 10^{-14}$ |
|  | $A_6$ | $-6.017 \times 10^{-13}$ | $B_7$ | $4.005 \times 10^{-17}$ |
|  | $A_7$ | 0 | $B_8$ | $-5.616 \times 10^{-19}$ |
|  | $A_8$ | $-8.040 \times 10^{-17}$ | $B_9$ | $1.444 \times 10^{-20}$ |
|  | $A_9$ | 0 | $B_{10}$ | $-1.834 \times 10^{-21}$ |
|  | $A_{10}$ | $5.138 \times 10^{-21}$ | $B_{11}$ | $-2.465 \times 10^{-24}$ |
|  | $A_{11}$ | 0 | $B_{12}$ | $1.419 \times 10^{-25}$ |

TABLE 3

| Surface Number | Main-Scanning Coefficients | | Sub-Scanning Coefficients | |
|---|---|---|---|---|
| 2 | K | $-1.934 \times 10^{-1}$ | $B_1$ | 0 |
|  | $A_1$ | 0 | $B_2$ | $-2.116 \times 10^{-6}$ |
|  | $A_2$ | 0 | $B_3$ | 0 |
|  | $A_3$ | 0 | $B_4$ | $4.472 \times 10^{-11}$ |
|  | $A_4$ | $1.790 \times 10^{-8}$ | $B_5$ | 0 |
|  | $A_5$ | 0 | $B_6$ | $3.322 \times 10^{-14}$ |
|  | $A_6$ | $2.847 \times 10^{-13}$ | $B_7$ | 0 |
|  | $A_7$ | 0 | $B_8$ | $-1.366 \times 10^{-18}$ |
|  | $A_8$ | $-3.723 \times 10^{-17}$ | $B_9$ | 0 |
|  | $A_9$ | 0 | $B_{10}$ | $-6.548 \times 10^{-22}$ |
|  | $A_{10}$ | $5.930 \times 10^{-21}$ | $B_{11}$ | 0 |
|  | $A_{11}$ | 0 | $B_{12}$ | $-4.619 \times 10^{-26}$ |

TABLE 4

| Surface Number | Main-Scanning Coefficients | | Sub-Scanning Coefficients | |
|---|---|---|---|---|
| 3 | K | −13.95 | $B_1$ | 0 |
|  | $A_1$ | 0 | $B_2$ | $-1.958 \times 10^{-7}$ |
|  | $A_2$ | 0 | $B_3$ | 0 |
|  | $A_3$ | 0 | $B_4$ | $2.316 \times 10^{-11}$ |
|  | $A_4$ | $-6.790 \times 10^{-9}$ | $B_5$ | 0 |

TABLE 4-continued

| Surface Number | Main-Scanning Coefficients | | Sub-Scanning Coefficients | |
|---|---|---|---|---|
|  | $A_5$ | 0 | $B_6$ | $-1.140 \times 10^{-15}$ |
|  | $A_6$ | $-2.046 \times 10^{-13}$ | $B_7$ | 0 |
|  | $A_7$ | 0 | $B_8$ | $1.179 \times 10^{-20}$ |
|  | $A_8$ | $7.466 \times 10^{-18}$ | $B_9$ | 0 |
|  | $A_9$ | 0 | $B_{10}$ | $9.187 \times 10^{-25}$ |
|  | $A_{10}$ | $5.282 \times 10^{-22}$ | $B_{11}$ | 0 |
|  | $A_{11}$ | 0 | $B_{12}$ | $-5.552 \times 10^{-29}$ |
|  | $A_{12}$ | $-8.143 \times 10^{-27}$ | $B_{13}$ | 0 |
|  | $A_{13}$ | 0 | $B_{14}$ | 0 |
|  | $A_{14}$ | $-3.771 \times 10^{-33}$ | $B_{15}$ | 0 |

TABLE 5

| Surface Number | Main-Scanning Coefficients | | Sub-Scanning Coefficients | |
|---|---|---|---|---|
| 4 | K | −69.07 | $B_1$ | $-9.030 \times 10^{-7}$ |
|  | $A_1$ | 0 | $B_2$ | $4.204 \times 10^{-7}$ |
|  | $A_2$ | 0 | $B_3$ | $-2.211 \times 10^{-11}$ |
|  | $A_3$ | 0 | $B_4$ | $-3.115 \times 10^{-11}$ |
|  | $A_4$ | $-1.348 \times 10^{-8}$ | $B_5$ | $1.857 \times 10^{-15}$ |
|  | $A_5$ | 0 | $B_6$ | $1.289 \times 10^{-15}$ |
|  | $A_6$ | $8.953 \times 10^{-14}$ | $B_7$ | $-1.444 \times 10^{-19}$ |
|  | $A_7$ | 0 | $B_8$ | $3.211 \times 10^{-21}$ |
|  | $A_8$ | $1.936 \times 10^{-17}$ | $B_9$ | $2.173 \times 10^{-23}$ |
|  | $A_9$ | 0 | $B_{10}$ | $-9.827 \times 10^{-25}$ |
|  | $A_{10}$ | $-2.840 \times 10^{-22}$ | $B_{11}$ | $-9.598 \times 10^{-28}$ |
|  | $A_{11}$ | 0 | $B_{12}$ | $-1.663 \times 10^{-29}$ |
|  | $A_{12}$ | $6.044 \times 10^{-27}$ | $B_{13}$ | 0 |
|  | $A_{13}$ | 0 | $B_{14}$ | 0 |
|  | $A_{14}$ | $1.077 \times 10^{-31}$ | $B_{15}$ | 0 |

TABLE 6

| 4 | $C_0$ | −1.000 | $I_0$ | $-8.009 \times 10^{-7}$ | $K_0$ | $-1.179 \times 10^{-9}$ |
|---|---|---|---|---|---|---|
|  | $C_1$ | 0 | $I_1$ | $-8.846 \times 10^{-11}$ | $K_1$ | $-9.850 \times 10^{-13}$ |
|  | $C_2$ | 0 | $I_2$ | $7.158 \times 10^{-11}$ | $K_2$ | $-9.672 \times 10^{-14}$ |
|  | $C_3$ | 0 | $I_3$ | $1.870 \times 10^{-13}$ | $K_3$ | $1.828 \times 10^{-15}$ |
|  | $C_4$ | 0 | $I_4$ | $-2.617 \times 10^{-14}$ | $K_4$ | $1.860 \times 10^{-16}$ |
|  | $C_5$ | 0 | $I_5$ | $6.722 \times 10^{-17}$ | $K_5$ | $-6.285 \times 10^{-19}$ |
|  | $C_6$ | 0 | $I_6$ | $5.872 \times 10^{-18}$ | $K_6$ | $-5.428 \times 10^{-20}$ |
|  | $C_7$ | 0 | $I_7$ | $-9.322 \times 10^{-21}$ | $K_7$ | $8.632 \times 10^{-23}$ |
|  | $C_8$ | 0 | $I_8$ | $-6.141 \times 10^{-22}$ | $K_8$ | $6.187 \times 10^{-24}$ |
|  | $C_9$ | 0 | $I_9$ | $5.471 \times 10^{-25}$ | $K_9$ | $-5.030 \times 10^{-27}$ |
|  | $C_{10}$ | 0 | $I_{10}$ | $2.868 \times 10^{-26}$ | $K_{10}$ | $-3.015 \times 10^{-28}$ |
|  | $C_{11}$ | 0 | $I_{11}$ | $-1.116 \times 10^{-29}$ | $K_{11}$ | $1.109 \times 10^{-31}$ |
|  | $C_{12}$ | 0 | $I_{12}$ | $-4.938 \times 10^{-31}$ | $K_{12}$ | $5.340 \times 10^{-33}$ |

In the second preferred embodiment, the multi-beam scanning device is configured to have the parameter K which is given by $$K = 0.82 \times 670 \times 10^{-3}/30 = 0.01831.$$

The configuration of this embodiment meets the conditions of the above formula (5). In the second preferred embodiment, the multi-beam scanning device is configured to have the parameter $K \cdot P/(\rho \cdot \cos \phi)$ which is given by $$K \cdot P/(\rho \cdot \cos\phi) = 0.01831 \times 21.167/20 \cdot \cos(29.45 \text{ deg.})$$

$$= 0.02225.$$

The configuration of this embodiment meets the conditions of the above formula (9).

Figure 7A:
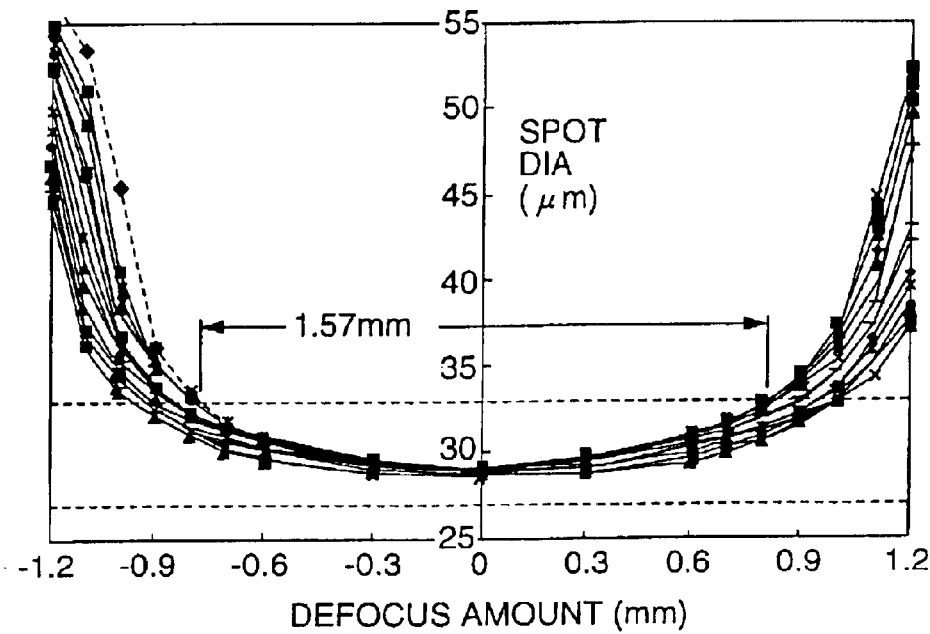
FIG. 7A and FIG. 7B are diagrams for explaining the relationship between the defocus amount and the spot diameter in the multi-beam scanning device of FIG. 6.
Figure 7B:
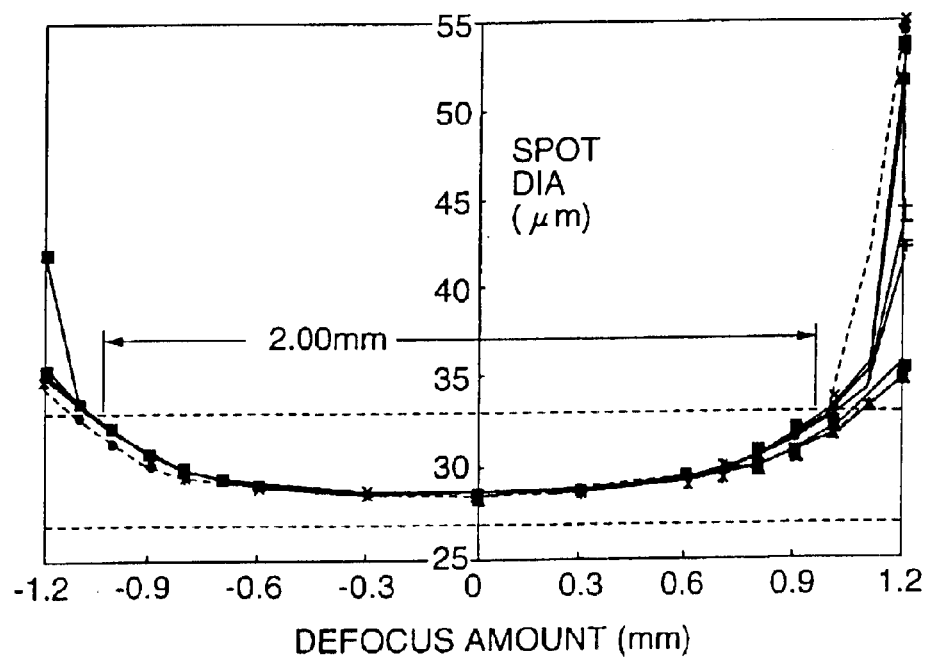

FIG. 7A and FIG. 7B are diagrams for explaining the relationship between the defocus amount and the spot diameter in the multi-beam scanning device of FIG. 6.

In the second preferred embodiment, the light emitting part "ch1" of the semiconductor laser array is positioned 28.43 μm apart from the optical axis of the coupling lens 122 in the sub-scanning direction. With respect to the defocus amount of the beam spot (which is formed on the scanned surface by the laser beam emitted from the light emitting part "ch1") at image-height positions of twenty-one equal subdivisions of ±150 mm, the relationship between the defocus amount and the beam spot diameter in the main scanning direction is shown in FIG. 7A. Similarly, the relationship between the defocus amount and the beam spot diameter in the sub-scanning direction is shown in FIG. 7B.

As shown in FIG. 7A, the depth clearance in the main scanning direction is 1.57 mm. As shown in FIG. 7B, the depth clearance in the sub-scanning direction is 2.00 mm. As both the depth clearances of this embodiment are larger than 0.9 mm (based on the practical experience), the multi-beam scanning device of this embodiment ensures adequate depth clearance even when the optical scanning is performed at the writing density of 1200 dpi, and effectively reduces the variations of the beam spots on the scanned surface to the small level so that the multi-beam scanning is carried out with accurate beam spot diameter.

The numerical aperture NAzS of this embodiment is 0.02225. It is confirmed that the variations of the divergence angle for the respective light emitting parts of the semiconductor laser array are effectively reduced. When a photoconductive material having the exposure energy of 6.3 mJ/m$^2$ is used as the photosensitive medium in this embodiment, the threshold level of the exposure energy at the scanning speed 380.8 m/sec is 7.22 mW. As the maximum output power of the laser array in this embodiment is 8 mW, the insufficient light energy as in the conventional multi-beam scanning device does not occur for the present embodiment.

Figure 8:
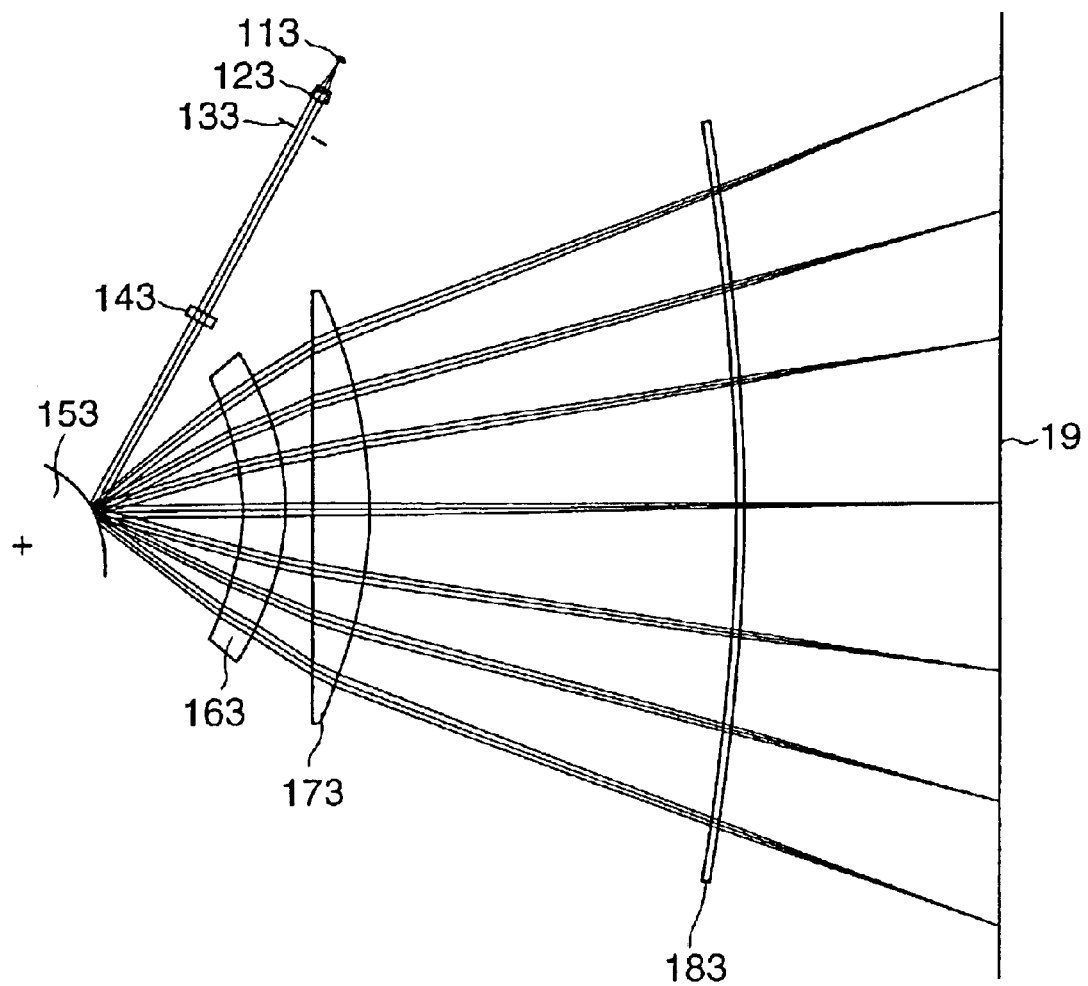
FIG. 8 is a diagram for explaining a configuration of the optical systems of a third preferred embodiment of the multi-beam scanning device.

Next, FIG. 8 shows a configuration of the optical systems of a third preferred embodiment of the multi-beam scanning device.

As shown in FIG. 8, the multi-beam scanning device of this embodiment generally comprises a semiconductor laser array 113, a coupling lens 123, an aperture stop 133, a cylindrical lens 143, a rotary polygonal mirror 153, lenses 163, 173 and 183 of the focusing optical system, and the scanned surface 19 of the photosensitive medium.

It is a matter of course that a planer mirror may be provided at an intermediate portion of the optical path between the light source 113 and the scanned surface 19 to bend the optical path in conformity with the practical layout of the multi-beam scanning device.

In the configuration of FIG. 8, the semiconductor laser array 113 is provided with four light emitting parts, the array pitchρ of the light emitting partsρ=14 μm, the emitted laser beam wavelength 780 nm, the maximum output power 10 mW, and the inclination angle φ=0 degrees.

The coupling lens 123 is provided with a single lens configuration, the focal length 15 mm, and the collimating function.

The cylindrical lens 143 is provided with the focal length 70.62 mm in the sub-scanning direction.

The aperture stop 133 is provided with the aperture width 5.5 mm the main scanning direction and the aperture width 0.88 mm in the sub-scanning direction.

The rotary polygonal mirror 153 is provided with six reflection surfaces, the inscribed circle radius 25 mm, the incident angle (between the laser beam incident direction of the light source and the optical axis of the focusing optical system) 60 degrees, the writing density 600 dpi, and the target beam spot diameter 60 μm.

The lenses 163, 173 and 183 of the focusing optical system are configured as in the following table.

|  | i | Rmi | Rsi | X | Y | n |
|---|---|---|---|---|---|---|
| Mirror Surface | 0 | ∞ | ∞ | 51.38 | 1.627 |  |
| Lens 163 | 1 | −96.76 | spherical | 15.07 | 0 | 1.78571 |
|  | 2 | −93.27 | spherical | 9.76 | 0 |  |
| Lens 173 | 3 | −2450.2 | spherical | 19.90 | 0 | 1.60909 |
|  | 4 | −161.76 | spherical | 127.0 | 0 |  |
| Lens 183 | 5 | −630.00 | −55.53 | 3.00 | 0 | 1.57211 |
|  | 6 | −700.00 | −24.42 | 101.72 | 0 |  |

The incident-side surface of the lens 183 (with the surface number i=5) has the main-scanning cross-section in the non-circular configuration. The non-circular configuration of this surface taken along the main-scanning cross-section is represented by the above equation (10). The following TABLE 7 provides the values of the main-scanning coefficients of the equation (10).

TABLE 7

| Surface No. | Main-Scanning Coefficients |  |
|---|---|---|
| 5 | K | −31.405 |
|  | $A_4$ | $-2.059 \times 10^{-9}$ |
|  | $A_6$ | $1.839 \times 10^{-14}$ |
|  | $A_8$ | $6.366 \times 10^{-18}$ |
|  | $A_{10}$ | $-8.922 \times 10^{-22}$ |
|  | $A_{12}$ | $6.466 \times 10^{-26}$ |
|  | $A_{14}$ | $-1.339 \times 10^{-30}$ |
|  | $A_{16}$ | $-1.058 \times 10^{-34}$ |
|  | $A_{18}$ | $4.413 \times 10^{-39}$ |

The focusing optical system of the third preferred embodiment is the same as that of the first preferred embodiment. In the third preferred embodiment, the multi-beam scanning device is configured to have the parameter K which is given by $$K = 0.82 \times 780 \times 10^{-3}/60 = 0.01066.$$

The configuration of this embodiment meets the conditions of the above formula (5). In the third preferred embodiment, the multi-beam scanning device is configured to have the parameter K·P/(ρ·cos φ) which is given by $$K \cdot P/(\rho \cdot \cos\phi) = 0.01066 \times 42.333/14$$
$$= 0.03223.$$

The configuration of this embodiment meets the conditions of the above formula (9).

Figure 9A:
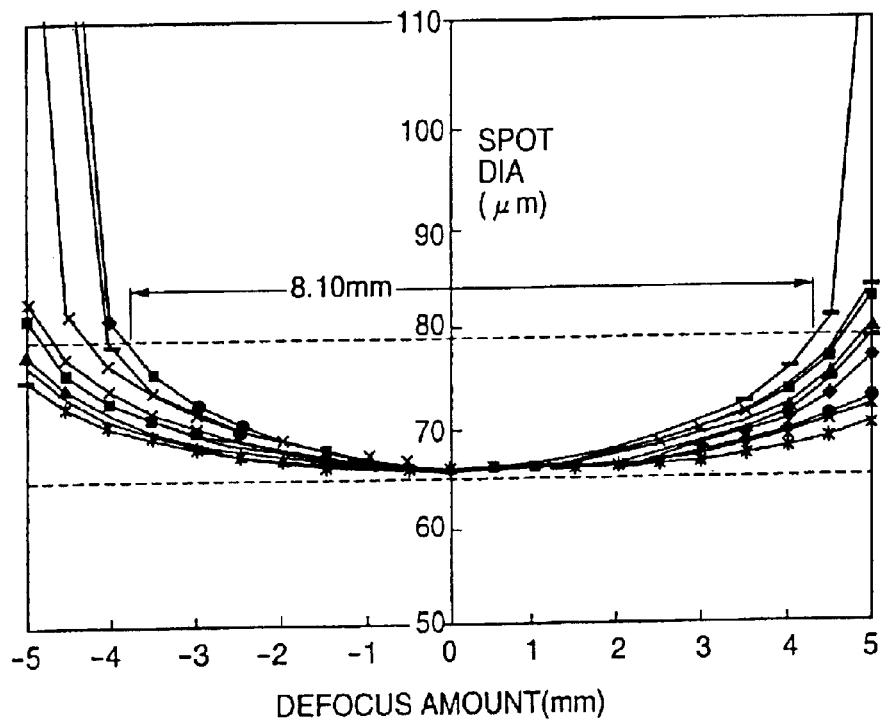
FIG. 9A and FIG. 9B are diagrams for explaining the relationship between the defocus amount and the spot diameter in the multi-beam scanning device of FIG. 8.
Figure 9B:
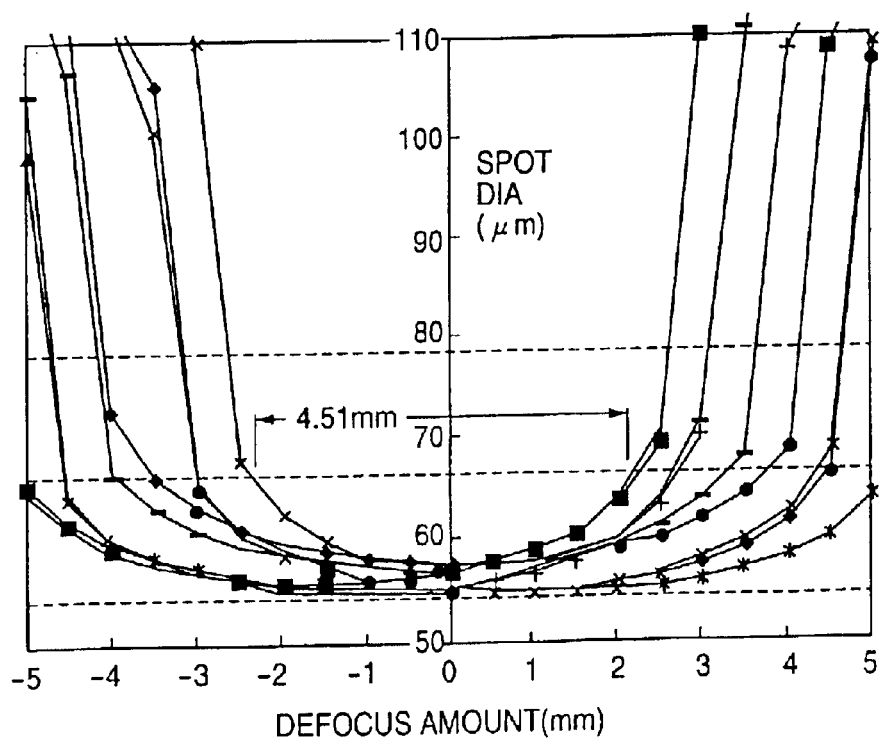

FIG. 9A and FIG. 9B are diagrams for explaining the relationship between the defocus amount and the spot diameter in the multi-beam scanning device of FIG. 8.

In the third preferred embodiment, the light emitting part "ch1" of the semiconductor laser array is positioned 21 μm apart from the optical axis of the coupling lens 123 in the sub-scanning direction. With respect to the defocus amount of the beam spot (which is formed on the scanned surface by the laser beam emitted from the light emitting part "ch1") at image-height positions of nine equal subdivisions of ±150 mm, the relationship between the defocus amount and the beam spot diameter in the main scanning direction is shown in FIG. 9A. Similarly, the relationship between the defocus amount and the beam spot diameter in the sub-scanning direction is shown in FIG. 9B.

As shown in FIG. 9A, the depth clearance in the main scanning direction is 8.10 mm. As shown in FIG. 9B, the depth clearance in the sub-scanning direction is 4.51 mm. As both the depth clearances of this embodiment are larger than 0.9 mm (based on the practical experience), the multi-beam scanning device of this embodiment ensures adequate depth clearance even when the optical scanning is performed at the writing density of 600 dpi, and effectively reduces the variations of the beam spots on the scanned surface to the small level so that the multi-beam scanning is carried out with accurate beam spot diameter.

The numerical aperture NAzS of this embodiment is 0.03223. It is confirmed that the variations of the divergence angle for the respective light emitting parts of the semiconductor laser array are effectively reduced. When a photoconductive material having the exposure energy of 6.3 mJ/m$^2$ is used as the photosensitive medium in this embodiment, the threshold level of the exposure energy at the scanning speed 380.8 m/sec is 7.28 mW. As the maximum output power of the laser array in this embodiment is 10 mW, the insufficient light energy as in the conventional multi-beam scanning device does not occur for the present embodiment.

Figure 10:
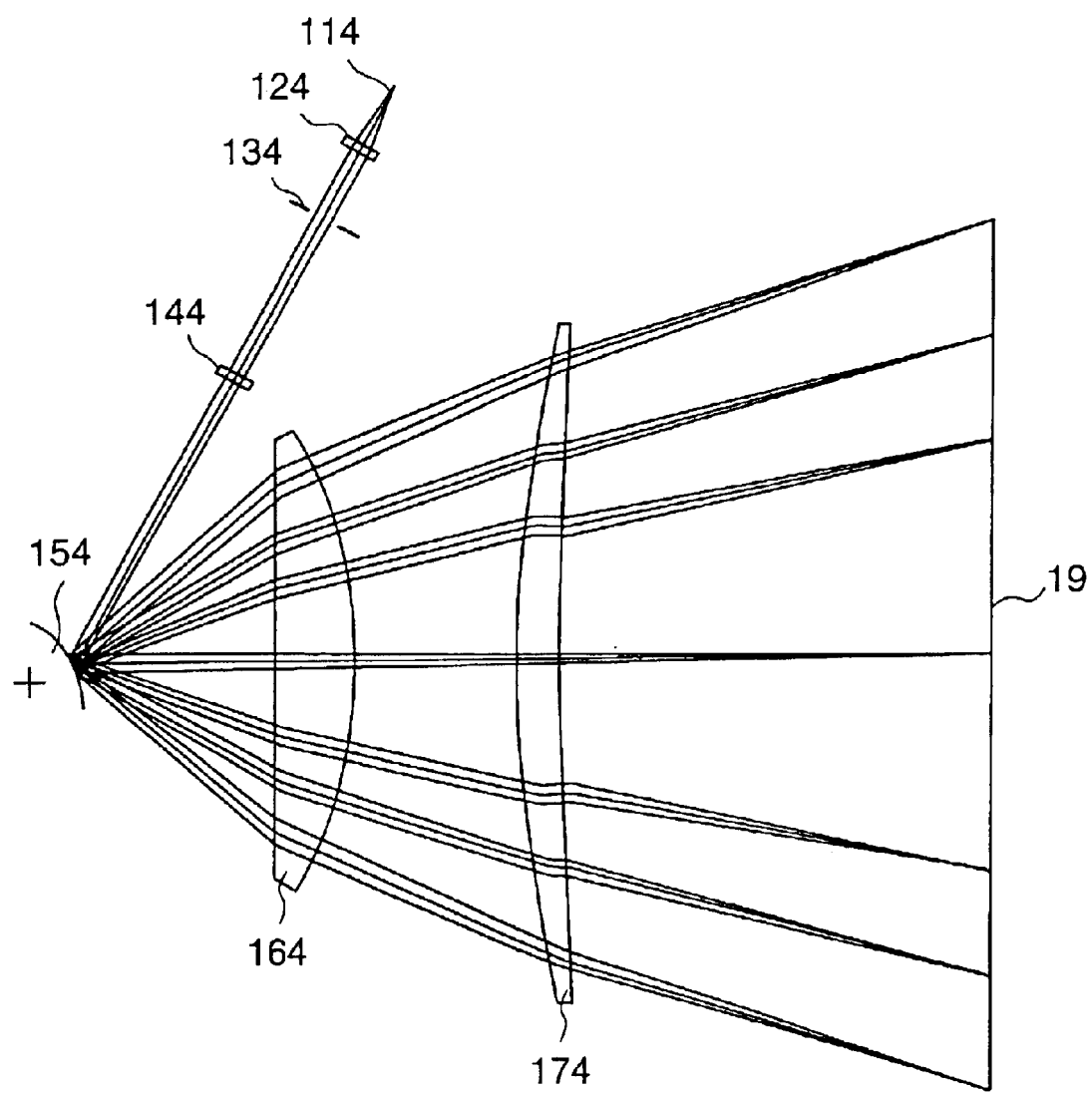
FIG. 10 is a diagram for explaining a configuration of the optical systems of a fourth preferred embodiment of the multi-beam scanning device.

Next, FIG. 10 shows a configuration of the optical systems of a fourth preferred embodiment of the multi-beam scanning device.

As shown in FIG. 10, the multi-beam scanning device of this embodiment generally comprises a semiconductor laser array 114, a coupling lens 124, an aperture stop 134, a cylindrical lens 144, a rotary polygonal mirror 154, lenses 164 and 174 of the focusing optical system, and the scanned surface 19 of the photosensitive medium.

It is a matter of course that a planer mirror may be provided at an intermediate portion of the optical path between the light source 114 and the scanned surface 19 to bend the optical path in conformity with the practical layout of the multi-beam scanning device.

In the configuration of FIG. 10, the semiconductor laser array 114 is provided with four light emitting parts, the array pitch$\rho$ of the light emitting parts$\rho$=14 $\mu$m, the emitted laser beam wavelength 780 nm, the maximum output power 10 mW, and the inclination angle $\phi$=62.3 degrees.

The coupling lens 124 is provided with a single lens configuration, the focal length 27 mm, and the collimating function.

The cylindrical lens 144 is provided with the focal length 126.18 mm in the sub-scanning direction.

The aperture stop 134 is provided with the aperture width 6.56 mm the main scanning direction and the aperture width 2.3 mm in the sub-scanning direction.

The rotary polygonal mirror 154 is provided with five reflection surfaces, the inscribed circle radius 18 mm, the incident angle (between the laser beam incident direction of the light source and the optical axis of the focusing optical system) 60 degrees, the writing density 1200 dpi, and the target beam spot diameter 45 $\mu$m.

The lenses 164 and 174 of the focusing optical system are configured as in the following table.

|  | I | Rmi | Rsi | X | Y | n |
|---|---|---|---|---|---|---|
| Mirror Surface | 0 | ∞ | ∞ | 72.56 | 0.286 |  |
| Lens 164 | 1 | 1616.43 | −50.14 | 35.00 | 0 | 1.52398 |
|  | 2 | −146.51 | −199.81 | 61.93 | 0.254 |  |
| Lens 174 | 3 | 400.87 | −72.03 | 14.00 | 0 | 1.52398 |
|  | 4 | 824.88 | −27.59 | 160.56 | 0 |  |

The surfaces (the surface number i=1, 2, 3) of the lenses 164 and 174 have the non-circular configuration represented by the above equations (10) and (11). The surface (the surface number i=4) of the lens 174 has the non-circular configuration represented by the above equations (11) through (13). The following TABLE 8 through TABLE 12 provide the values of the main-scanning coefficients and the sub-scanning coefficients of the equations (10) through (13).

TABLE 8

| Surface Number | Main-Scanning Coefficients | | Sub-Scanning Coefficients | |
|---|---|---|---|---|
| 1 | K | $1.976 \times 10^{+2}$ | $B_1$ | $-1.162 \times 10^{-5}$ |
|  | $A_1$ | 0 | $B_2$ | $2.276 \times 10^{-6}$ |
|  | $A_2$ | 0 | $B_3$ | $2.714 \times 10^{-9}$ |
|  | $A_3$ | 0 | $B_4$ | $-1.544 \times 10^{-10}$ |
|  | $A_4$ | $1.281 \times 10^{-8}$ | $B_5$ | $-4.265 \times 10^{-13}$ |
|  | $A_5$ | 0 | $B_6$ | $6.417 \times 10^{-15}$ |
|  | $A_6$ | $-6.374 \times 10^{-13}$ | $B_7$ | $9.179 \times 10^{-19}$ |
|  | $A_7$ | 0 | $B_8$ | $-1.230 \times 10^{-19}$ |
|  | $A_8$ | $-9.428 \times 10^{-17}$ | $B_9$ | $1.453 \times 10^{-20}$ |
|  | $A_9$ | 0 | $B_{10}$ | $-1.881 \times 10^{-22}$ |
|  | $A_{10}$ | $5.965 \times 10^{-21}$ | $B_{11}$ | $-1.468 \times 10^{-24}$ |
|  | $A_{11}$ | 0 | $B_{12}$ | $-2.670 \times 10^{-26}$ |

TABLE 9

| Surface Number | Main-Scanning Coefficients | | Sub-Scanning Coefficients | |
|---|---|---|---|---|
| 2 | K | $-1.857 \times 10^{-1}$ | $B_1$ | 0 |
|  | $A_1$ | 0 | $B_2$ | $-2.125 \times 10^{-6}$ |
|  | $A_2$ | 0 | $B_3$ | 0 |
|  | $A_3$ | 0 | $B_4$ | $1.805 \times 10^{-11}$ |
|  | $A_4$ | $1.774 \times 10^{-8}$ | $B_5$ | 0 |
|  | $A_5$ | 0 | $B_6$ | $2.716 \times 10^{-14}$ |
|  | $A_6$ | $1.384 \times 10^{-13}$ | $B_7$ | 0 |
|  | $A_7$ | 0 | $B_8$ | $6.924 \times 10^{-19}$ |
|  | $A_8$ | $-4.354 \times 10^{-17}$ | $B_9$ | 0 |
|  | $A_9$ | 0 | $B_{10}$ | $-2.685 \times 10^{-22}$ |
|  | $A_{10}$ | $7.168 \times 10^{-21}$ | $B_{11}$ | 0 |
|  | $A_{11}$ | 0 | $B_{12}$ | $-5.778 \times 10^{-26}$ |

TABLE 10

| Surface Number | Main-Scanning Coefficients | | Sub-Scanning Coefficients | |
|---|---|---|---|---|
| 3 | K | −12.60 | $B_1$ | 0 |
|  | $A_1$ | 0 | $B_2$ | $-1.962 \times 10^{-7}$ |
|  | $A_2$ | 0 | $B_3$ | 0 |
|  | $A_3$ | 0 | $B_4$ | $2.230 \times 10^{-11}$ |
|  | $A_4$ | $-7.349 \times 10^{-9}$ | $B_5$ | 0 |
|  | $A_5$ | 0 | $B_6$ | $-1.022 \times 10^{-15}$ |
|  | $A_6$ | $-2.106 \times 10^{-13}$ | $B_7$ | 0 |
|  | $A_7$ | 0 | $B_8$ | $1.081 \times 10^{-20}$ |
|  | $A_8$ | $8.173 \times 10^{-8}$ | $B_9$ | 0 |
|  | $A_9$ | 0 | $B_{10}$ | $6.363 \times 10^{-25}$ |
|  | $A_{10}$ | $5.409 \times 10^{-22}$ | $B_{11}$ | 0 |
|  | $A_{11}$ | 0 | $B_{12}$ | $-3.645 \times 10^{-29}$ |
|  | $A_{12}$ | $-1.082 \times 10^{-26}$ | $B_{13}$ | 0 |
|  | $A_{13}$ | 0 | $B_{14}$ | 0 |
|  | $A_{14}$ | $-2.039 \times 10^{-32}$ | $B_{15}$ | 0 |

TABLE 11

| Surface Number | Main-Scanning Coefficients | | Sub-Scanning Coefficients | |
|---|---|---|---|---|
| 4 | K | −71.068 | $B_1$ | $-8.546 \times 10^{-7}$ |
|   | $A_1$ | 0 | $B_2$ | $4.161 \times 10^{-7}$ |
|   | $A_2$ | 0 | $B_3$ | $-2.523 \times 10^{-7}$ |
|   | $A_3$ | 0 | $B_4$ | $-2.960 \times 10^{-11}$ |
|   | $A_4$ | $-1.324 \times 10^{-8}$ | $B_5$ | $2.114 \times 10^{-16}$ |
|   | $A_5$ | 0 | $B_6$ | $1.160 \times 10^{-15}$ |
|   | $A_6$ | $9.662 \times 10^{-14}$ | $B_7$ | $4.372 \times 10^{-22}$ |
|   | $A_7$ | 0 | $B_8$ | $-1.098 \times 10^{-21}$ |
|   | $A_8$ | $1.888 \times 10^{-17}$ | $B_9$ | $5.560 \times 10^{-24}$ |
|   | $A_9$ | 0 | $B_{10}$ | $-7.785 \times 10^{-25}$ |
|   | $A_{10}$ | $-3.102 \times 10^{-22}$ | $B_{11}$ | $-1.617 \times 10^{-29}$ |
|   | $A_{11}$ | 0 | $B_{12}$ | $3.262 \times 10^{-30}$ |
|   | $A_{12}$ | $7.298 \times 10^{-27}$ | $B_{13}$ | 0 |
|   | $A_{13}$ | 0 | $B_{14}$ | 0 |
|   | $A_{14}$ | $2.305 \times 10^{-32}$ | $B_{15}$ | 0 |

TABLE 12

| 4 | $C_0$ | $-3.940 \times 10^{-1}$ | $I_0$ | $2.869 \times 10^{-6}$ | $K_0$ | $-1.526 \times 10^{-9}$ |
|---|---|---|---|---|---|---|
|   | $C_1$ | $1.796 \times 10^{-4}$ | $I_1$ | $4.012 \times 10^{-11}$ | $K_1$ | $-3.101 \times 10^{-11}$ |
|   | $C_2$ | $2.425 \times 10^{-5}$ | $I_2$ | $1.690 \times 10^{-11}$ | $K_2$ | $-8.903 \times 10^{-12}$ |
|   | $C_3$ | $4.438 \times 10^{-8}$ | $I_3$ | $3.572 \times 10^{-14}$ | $K_3$ | $5.017 \times 10^{-14}$ |
|   | $C_4$ | $4.584 \times 10^{-10}$ | $I_4$ | $-8.742 \times 10^{-15}$ | $K_4$ | $3.241 \times 10^{-15}$ |
|   | $C_5$ | $-2.438 \times 10^{-12}$ | $I_5$ | $1.964 \times 10^{-18}$ | $K_5$ | $-7.703 \times 10^{-18}$ |
|   | $C_6$ | $-3.396 \times 10^{-14}$ | $I_6$ | $8.603 \times 10^{-19}$ | $K_6$ | $-4.104 \times 10^{-19}$ |
|   | $C_7$ | $4.132 \times 10^{-17}$ | $I_7$ | $6.610 \times 10^{-23}$ | $K_7$ | $5.118 \times 10^{-22}$ |
|   | $C_8$ | $6.805 \times 10^{-19}$ | $I_8$ | $-3.347 \times 10^{-23}$ | $K_8$ | $2.368 \times 10^{-23}$ |
|   | $C_9$ | 0 | $I_9$ | $-3.693 \times 10^{-28}$ | $K_9$ | $-1.550 \times 10^{-26}$ |
|   | $C_{10}$ | 0 | $I_{10}$ | $4.536 \times 10^{-28}$ | $K_{10}$ | $-6.371 \times 10^{-28}$ |
|   | $C_{11}$ | 0 | $I_{11}$ | 0 | $K_{11}$ | $1.748 \times 10^{-31}$ |
|   | $C_{12}$ | 0 | $I_{12}$ | 0 | $K_{12}$ | $6.503 \times 10^{-33}$ |

In the fourth preferred embodiment, the multi-beam scanning device is configured to have the parameter K which is given by $$K = 0.82 \times 780 \times 10^{-3}/45 = 0.01421.$$

The configuration of this embodiment meets the conditions of the above formula (5). In the fourth preferred embodiment, the multi-beam scanning device is configured to have the parameter $K \cdot P/(\rho \cdot \cos \phi)$ which is given by $$K \cdot P/(\rho \cdot \cos\phi) = 0.01421 \times 21.167/14 \cdot \cos(62.3 \text{ deg.})$$
$$= 0.04622.$$

The configuration of this embodiment meets the conditions of the above formula (9).

Figure 11A:
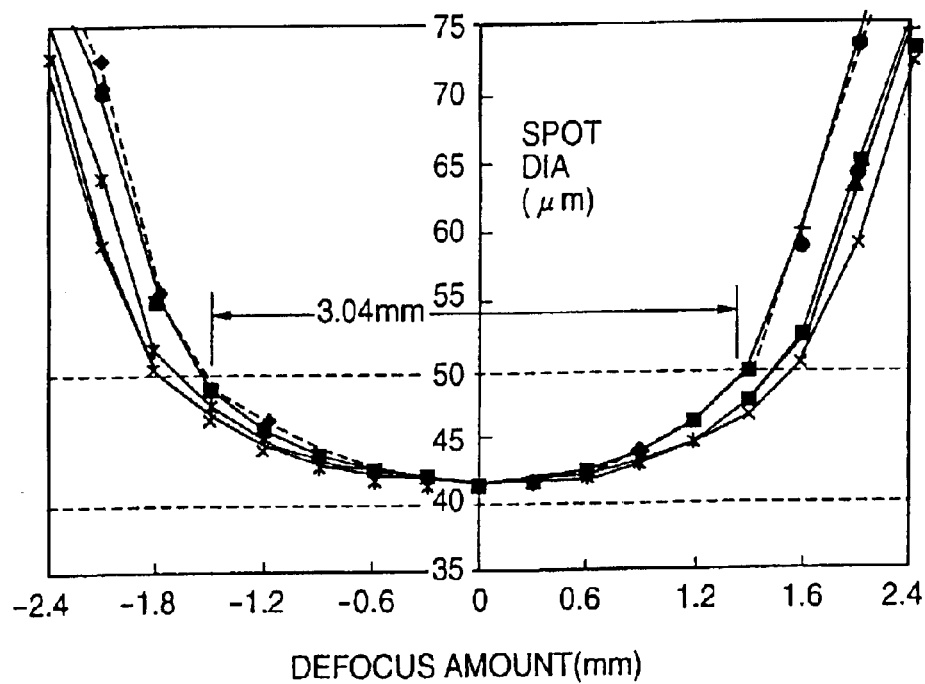
FIG. 11A and FIG. 11B are diagrams for explaining the relationship between the defocus amount and the spot diameter in the multi-beam scanning device of FIG. 10.
Figure 11B:
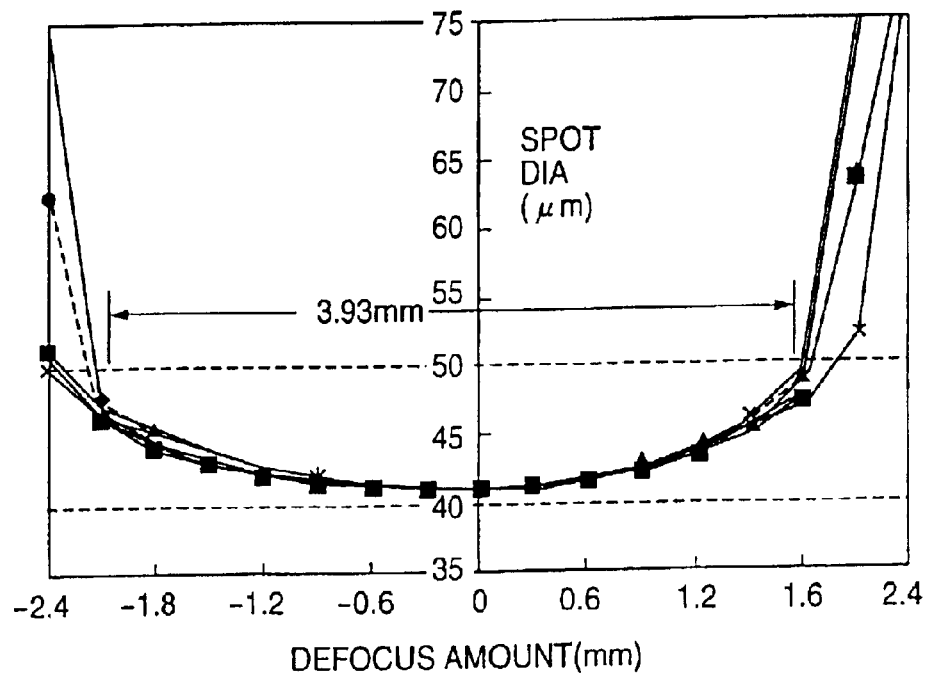

FIG. 11A and FIG. 11B are diagrams for explaining the relationship between the defocus amount and the spot diameter in the multi-beam scanning device of FIG. 10.

In the fourth preferred embodiment, the light emitting part "ch1" of the semiconductor laser array is positioned 18.48 μm apart from the optical axis of the coupling lens 124 in the sub-scanning direction. With respect to the defocus amount of the beam spot (which is formed on the scanned surface by the laser beam emitted from the light emitting part "ch1") at image-height positions of nine equal subdivisions of ±150 mm, the relationship between the defocus amount and the beam spot diameter in the main scanning direction is shown in FIG. 11A. Similarly, the relationship between the defocus amount and the beam spot diameter in the sub-scanning direction is shown in FIG. 11B.

As shown in FIG. 11A, the depth clearance in the main scanning direction is 3.04 mm. As shown in FIG. 11B, the depth clearance in the sub-scanning direction is 3.93 mm. As both the depth clearances of this embodiment are larger than 0.9 mm (based on the practical experience), the multi-beam scanning device of this embodiment ensures adequate depth clearance even when the optical scanning is performed at the writing density of 1200 dpi, and effectively reduces the variations of the beam spots on the scanned surface to the small level so that the multi-beam scanning is carried out with accurate beam spot diameter.

The numerical aperture NAzS of this embodiment is 0.04622. It is confirmed that the variations of the divergence angle for the respective light emitting parts of the semiconductor laser array are effectively reduced. When a photoconductive material having the exposure energy of 6.3 mJ/m² is used as the photosensitive medium in this embodiment, the threshold level of the exposure energy at the scanning speed 380.8 m/sec is 7.40 mW. As the maximum output power of the laser array in this embodiment is 10 mW, the insufficient light energy as in the conventional multi-beam scanning device does not occur for the present embodiment.

Figure 12A:
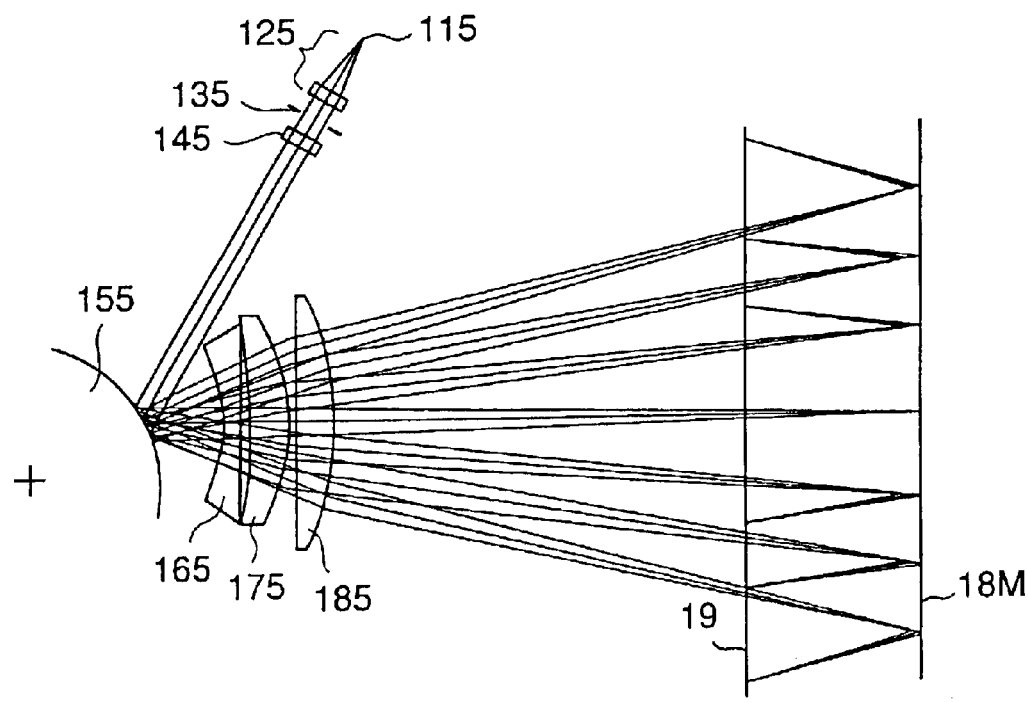
FIG. 12A and FIG. 12B are diagrams for explaining a configuration of the optical systems of a fifth preferred embodiment of the multi-beam scanning device.
Figure 12B:

Next, FIG. 12A and FIG. 12B show a configuration of the optical systems of a fifth preferred embodiment of the multi-beam scanning device. The configuration of this embodiment in the main scanning direction is shown in FIG. 12A, and the configuration of this embodiment in the sub-scanning direction is shown in FIG. 12B.

As shown in FIG. 12A and FIG. 12B, the multi-beam scanning device of this embodiment generally comprises a semiconductor laser array 115, a coupling lens 125, an aperture stop 135, a cylindrical lens 145, a rotary polygonal mirror 155, three lenses 165, 175 and 185 and a cylindrical mirror 18M of the focusing optical system, and the scanned surface 19 of the photosensitive medium.

It is a matter of course that a planer mirror may be provided at an intermediate portion of the optical path between the light source 115 and the scanned surface 19 to bend the optical path in conformity with the practical layout of the multi-beam scanning device.

In the configuration of FIG. 12A and FIG. 12B, the semiconductor laser array 115 is provided with four light emitting parts, the array pitchρ of the light emitting partsρ= 10 μm, the emitted laser beam wavelength 670 nm, the maximum output power 8 mW, and the inclination angle φ=0 degrees.

The coupling lens 125 is provided with a two-group, three-lens configuration, the focal length 22 mm, and the collimating function.

The cylindrical lens 145 is provided with a two-lens combined configuration and the focal length 189.77 mm in the sub-scanning direction.

The aperture stop 135 is provided with the aperture width 10.5 mm in the main scanning direction and the aperture width 1.96 mm in the sub-scanning direction.

The rotary polygonal mirror 156 is provided with six reflection surfaces, the inscribed circle radius 65 mm, the incident angle 60 degrees, the writing density 850 dpi, and the target beam spot diameter 35 $\mu$m.

The lenses 165, 175, 185 and the mirror 18M of the focusing optical system are configured as in the following table.

|  | i | Rmi | Rsi | X | Y | n |
|---|---|---|---|---|---|---|
| Mirror Surface | 0 | ∞ | ∞ | 45.50 | 0.499 |  |
| Lens 165 | 1 | −78.22 | spherical | 9.80 | 0 | 1.58700 |
|  | 2 | −1115.4 | spherical | 3.95 | 0 |  |
| Lens 175 | 3 | −318.06 | spherical | 20.6 | 0 | 1.78097 |
|  | 4 | −112.85 | spherical | 2.04 | 0 |  |
| Lens 185 | 5 | 639.11 | spherical | 23.00 | 0 | 1.45419 |
|  | 6 | −158.15 | spherical | 315.00 | 0 |  |
| Mirror 18M | 7 | ∞ | −169.87 | 99.97 | 0 |  |

In the fifth preferred embodiment, the multi-beam scanning device is configured to have the parameter K which is given by $$K = 0.82 \times 670 \times 10^{-3}/35 = 0.01570.$$

The configuration of this embodiment meets the conditions of the above formula (5). In the third preferred embodiment, the multi-beam scanning device is configured to have the parameter $K \cdot P/(\rho \cdot \cos \phi)$ which is given by $$K \cdot P/(\rho \cdot \cos\phi) = 0.01570 \times 29.882/10$$
$$= 0.04691.$$

The configuration of this embodiment meets the conditions of the above formula (9).

Figure 13A:
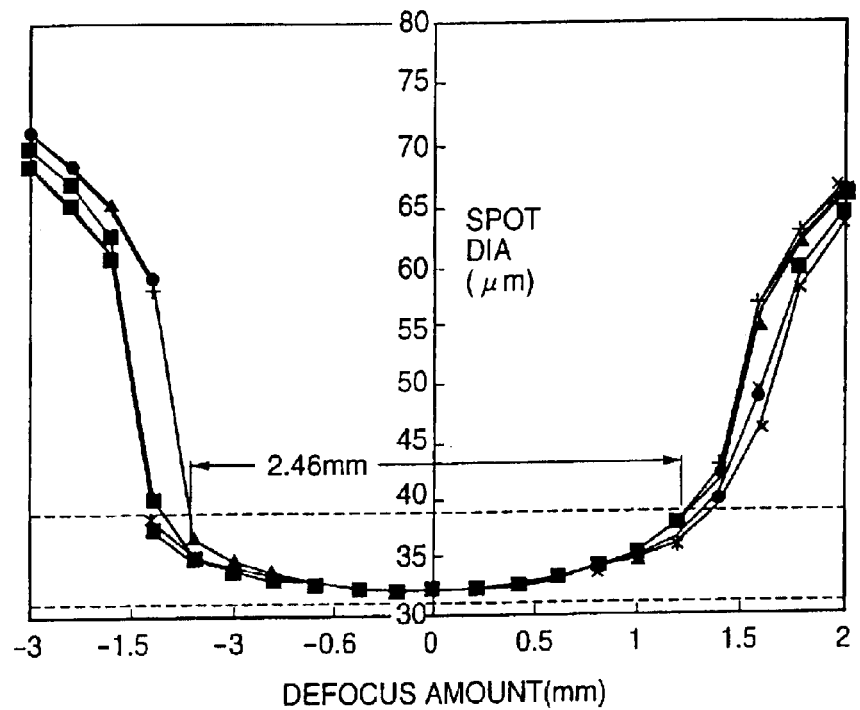
FIG. 13A and FIG. 13B are diagrams for explaining the relationship between the defocus amount and the spot diameter in the multi-beam scanning device of FIG. 12A and FIG. 12B.
Figure 13B:
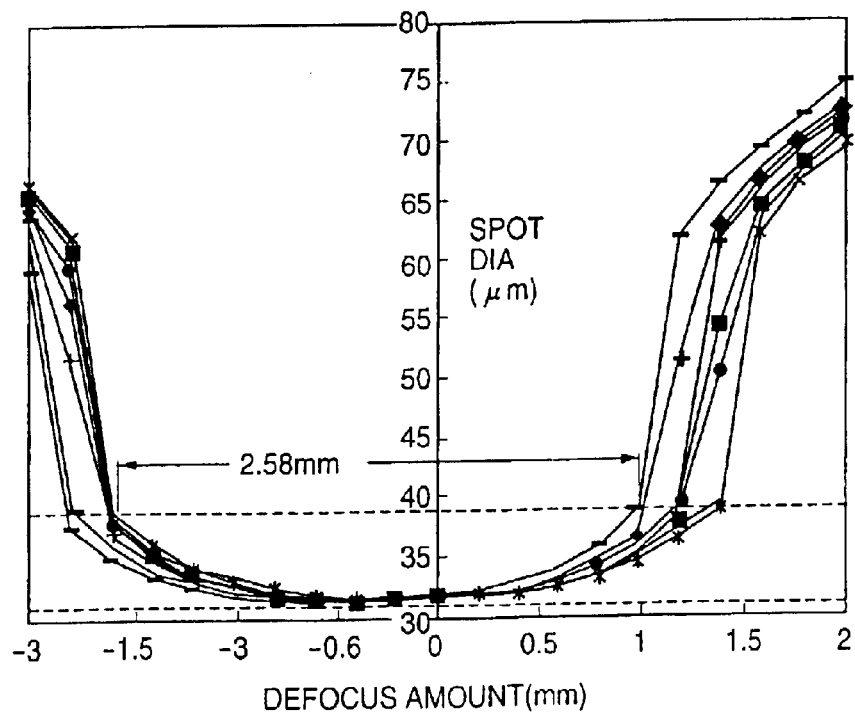

FIG. 13A and FIG. 13B are diagrams for explaining the relationship between the defocus amount and the spot diameter in the multi-beam scanning device of FIG. 12A and FIG. 12B.

In the fifth preferred embodiment, the light emitting part "ch1" of the semiconductor laser array is positioned 15 $\mu$m apart from the optical axis of the coupling lens 125 in the sub-scanning direction. With respect to the defocus amount of the beam spot (which is formed on the scanned surface by the laser beam emitted from the light emitting part "ch1") at image-height positions of nine equal subdivisions of ±150 mm, the relationship between the defocus amount and the beam spot diameter in the main scanning direction is shown in FIG. 13A. Similarly, the relationship between the defocus amount and the beam spot diameter in the sub-scanning direction is shown in FIG. 13B.

As shown in FIG. 13A, the depth clearance in the main scanning direction is 2.46 mm. As shown in FIG. 13B, the depth clearance in the sub-scanning direction is 2.58 mm. As both the depth clearances of this embodiment are larger than 0.9 mm (based on the practical experience), the multi-beam scanning device of this embodiment ensures adequate depth clearance even when the optical scanning is performed at the writing density of 850 dpi, and effectively reduces the variations of the beam spots on the scanned surface to the small level so that the multi-beam scanning is carried out with accurate beam spot diameter.

The numerical aperture NAzS of this embodiment is 0.04691. It is confirmed that the variations of the divergence angle for the respective light emitting parts of the semiconductor laser array are effectively reduced. When a photoconductive material having the exposure energy of 5.5 mJ/m$^2$ is used as the photosensitive medium in this embodiment, the threshold level of the exposure energy at the scanning speed 380.8 m/sec is 4.96 mW. As the maximum output power of the laser array in this embodiment is 8 mW, the insufficient light energy as in the conventional multi-beam scanning device does not occur for the present embodiment.

Next, FIG. 14 shows a configuration of the optical systems of a sixth preferred embodiment of the multi-beam scanning device.

As shown in FIG. 14, the multi-beam scanning device of this embodiment generally comprises a semiconductor laser array 116, a coupling lens 126, an aperture stop 136, a beam expander BX, a cylindrical lens 146, a rotary polygonal mirror 156, lenses 166, 176 and 186 of the focusing optical system, and the scanned surface 19 of the photosensitive medium.

It is a matter of course that a planer mirror may be provided at an intermediate portion of the optical path between the light source 116 and the scanned surface 19 to bend the optical path in conformity with the practical layout of the multi-beam scanning device.

In the configuration of FIG. 14, the semiconductor laser array 116 is provided with four light emitting parts, the array pitch $\rho$ of the light emitting parts $\rho = 10$ $\mu$m, the emitted laser beam wavelength 780 nm, the maximum output power 10 mW, and the inclination angle $\phi = 81.14$ degrees.

The coupling lens 126 is provided with a two-group, three-lens configuration, the focal length 35 mm, and the coupling function to convert the divergent laser beams emitted by the semiconductor laser array into less divergent laser beams.

The beam expander BX is provided between the coupling lens and the rotary deflector to enlarge the diameter of the laser beams, passed through the coupling lens, in the main scanning direction. The beam expander BX does not provide any beam expanding function to enlarge the diameter of the laser beams in the sub-scanning direction. The magnification factor of the beam expander BX is 10.

The cylindrical lens 146 is provided with the focal length 149.43 mm in the sub-scanning direction.

The aperture stop 136 is provided with the aperture width 2.04 mm in the main scanning direction and the aperture width 17.4 mm in the sub-scanning direction.

The rotary polygonal mirror 156 is provided with eight reflection surfaces, the inscribed circle radius 75 mm, the incident angle (between the laser beam incident direction of the light source and the optical axis of the focusing optical system) 50 degrees, the writing density 1200 dpi, and the target beam spot diameter 35 $\mu$m.

The lenses 166, 176 and 186 of the focusing optical system are configured as in the following table.

|  | i | Rmi | Rsi | X | Y | n |
|---|---|---|---|---|---|---|
| Mirror Surface | 0 | ∞ | ∞ | 108.00 | 0.381 |  |
| Lens 166 | 1 | −126.00 | spherical | 13.10 | 0 | 1.58201 |
|  | 2 | ∞ | 142.95 | 10.60 | 0 |  |
| Lens 176 | 3 | −2450.0 | spherical | 22.50 | 0 | 1.49282 |
|  | 4 | −150.00 | spherical | 5.60 | 0 |  |
| Lens 186 | 5 | ∞ | ∞ | 27.00 | 0 | 1.70400 |
|  | 6 | −294.00 | −81.10 | 655.10 | 0 |  |

In the sixth embodiment, the inclination angle $\phi$ is set to 81.14 degrees that is near 90 degrees. The far-field pattern of this embodiment is similar to that shown in FIG. 3D. The diameter of the laser beams emitted from the laser array is small in the main scanning direction and large in the sub-scanning direction. In order to obtain an adequate laser beam diameter needed for the main scanning direction, the coupling function of the coupling lens 126 is insufficient. For this reason, the beam expander BX is provided to enlarge the diameter of the laser beams in the main scanning direction.

In the sixth preferred embodiment, the multi-beam scanning device is configured to have the parameter K which is given by $$K=0.82\times780\times10^{-3}/35=0.01827.$$

The configuration of this embodiment meets the conditions of the above formula (5). In the third preferred embodiment, the multi-beam scanning device is configured to have the parameter $K \cdot P/(\rho \cdot \cos \phi)$ which is given by $$K \cdot P/(\rho \cdot \cos\phi) = 0.01827 \times 21.167/1 \cdot \cos(81.14 \text{ deg.})$$
$$= 0.25108.$$

The configuration of this embodiment meets the conditions of the above formula (9).

Figure 15A:
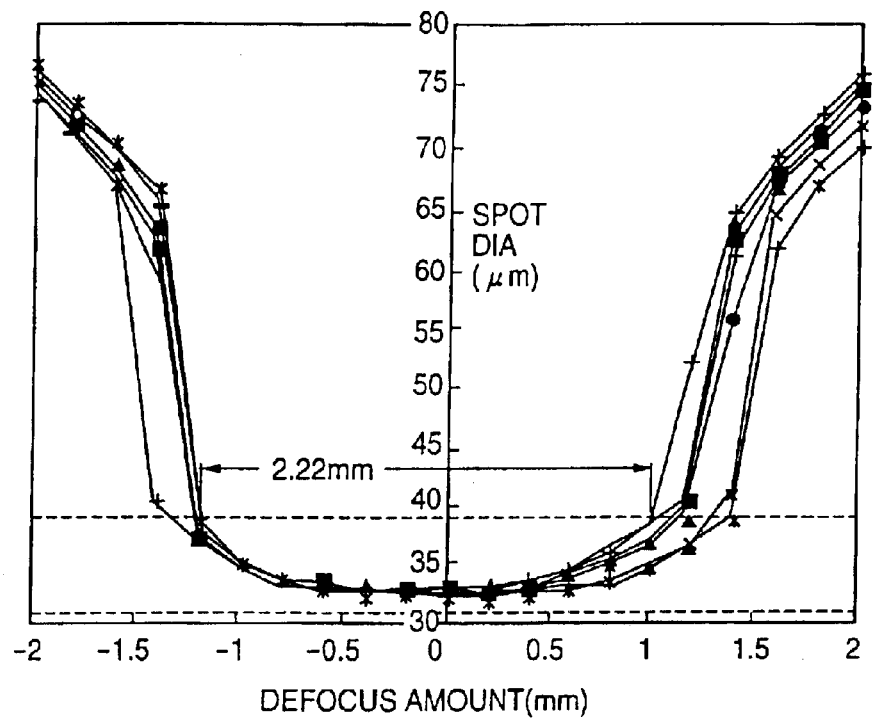
FIG. 15A and FIG. 15B are diagrams for explaining the relationship between the defocus amount and the spot diameter in the multi-beam scanning device of FIG. 14.
Figure 15B:
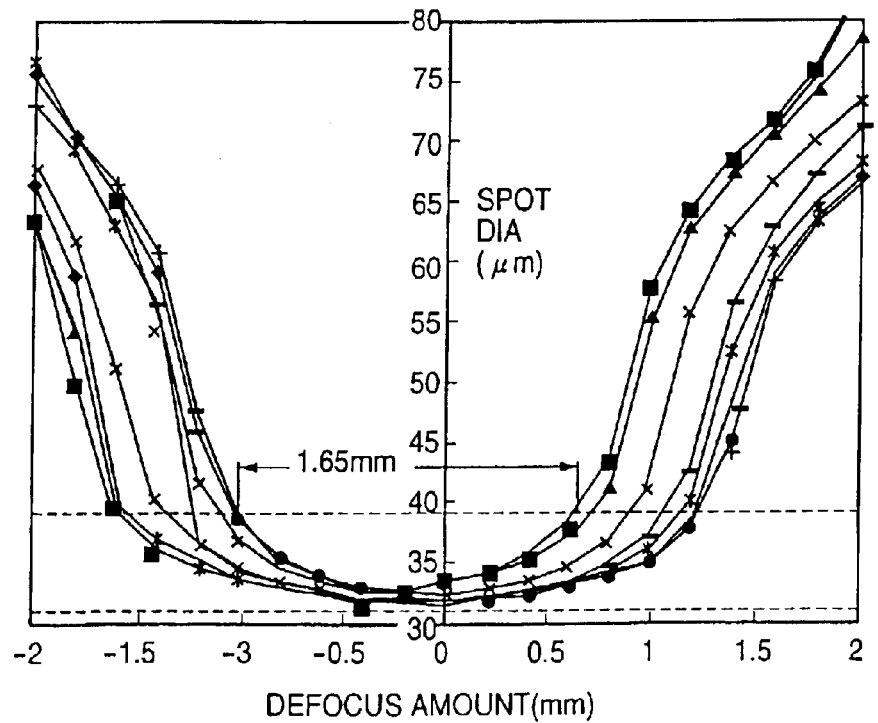

FIG. 15A and FIG. 15B are diagrams for explaining the relationship between the defocus amount and the spot diameter in the multi-beam scanning device of FIG. 14.

In the sixth preferred embodiment, the light emitting part "ch1" of the semiconductor laser array is positioned 12.57 $\mu$m apart from the optical axis of the coupling lens 126 in the sub-scanning direction. With respect to the defocus amount of the beam spot (which is formed on the scanned surface by the laser beam emitted from the light emitting part "ch1") at image-height positions of nine equal subdivisions of ±150 mm, the relationship between the defocus amount and the beam spot diameter in the main scanning direction is shown in FIG. 15A. Similarly, the relationship between the defocus amount and the beam spot diameter in the sub-scanning direction is shown in FIG. 15B.

As shown in FIG. 15A, the depth clearance in the main scanning direction is 2.22 mm. As shown in FIG. 15B, the depth clearance in the sub-scanning direction is 1.65 mm. As both the depth clearances of this embodiment are larger than 0.9 mm (based on the practical experience), the multi-beam scanning device of this embodiment ensures adequate depth clearance even when the optical scanning is performed at the writing density of 1200 dpi, and effectively reduces the variations of the beam spots on the scanned surface to the small level so that the multi-beam scanning is carried out with accurate beam spot diameter.

The numerical aperture NAzS of this embodiment is 0.25108. It is confirmed that the variations of the divergence angle for the respective light emitting parts of the semiconductor laser array are effectively reduced. When a photoconductive material having the exposure energy of 4.4 mJ/m$^2$ is used as the photosensitive medium in this embodiment, the threshold level of the exposure energy at the scanning speed 380.8 m/sec is 9.38 mW. As the maximum output power of the laser array in this embodiment is 10 mW, the insufficient light energy as in the conventional multi-beam scanning device does not occur for the present embodiment.

Figure 16:
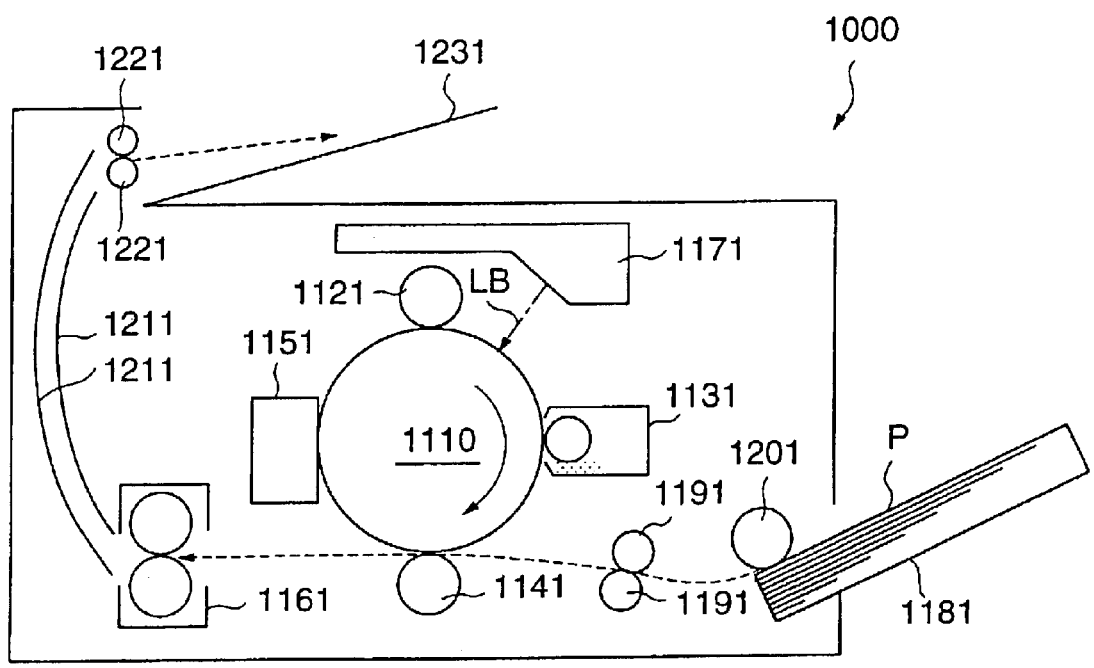
FIG. 16 is a diagram for explaining one preferred embodiment of the image forming apparatus of the present invention.

Finally, FIG. 16 shows a configuration of one preferred embodiment of the image forming apparatus of the present invention.

In the present embodiment, the image forming apparatus of the invention is applied to a laser printer, and one embodiment of the multi-beam scanning device of the invention is provided in the laser printer.

As shown in FIG. 16, the laser printer 1000 includes a photoconductive drum 1110 which is provided as the photosensitive medium that is exposed to an imaging light pattern provided by the multi-beam scanning device. At surrounding portions around the photoconductive drum 1110, a charging roller 1121, a developing unit 1131, a transfer roller 1141, and a cleaning unit 1151 are provided. A known corona charger may be used as the charging unit 1121.

In the laser printer 1000 of FIG. 16, a multi-beam scanning device 1171 according to one embodiment of the present invention is provided, and a scanned surface of the photoconductive drum 1110, which is located between the charging unit 1121 and the developing unit 1131, is exposed to multiple laser beams LB provided by the multi-beam scanning device 1171.

Further, in the laser printer 1000 of FIG. 16, a fixing unit 1141, a paper cassette 1181, registration rollers 1191, a paper feeding roller 1201, a transport passage 1211, ejection rollers 1221, and a paper tray 1231 are provided. In the paper cassette 1181, a plurality of copy sheets P are contained.

When an image forming operation is performed by the laser printer 1000, the photoconductive drum 1110 is rotated at a constant speed in a clockwise rotation direction as indicated by the arrow in FIG. 16. The surface of the photoconductive drum 1110 is uniformly charged by the charging unit 1121. The charged surface of the photoconductive drum 1110 is exposed to the multiple laser beams LB (the imaging light pattern) provided by the multi-beam scanning device 1171, so that an electrostatic latent image is formed on the scanned surface of the photoconductive drum 1110. In the present embodiment, the electrostatic latent image is a negative latent image.

Further, the developing unit 1131 develops the latent image of the photoconductive drum 1110 with toner, and a toned image is produced on the scanned surface of the photoconductive drum 1110.

In the laser printer 1000, the paper cassette 1181 is removably attached to the main body of the laser printer 1000 as shown in FIG. 16. One of the copy sheets P from the paper cassette 1181 is delivered to the inside of the main body by the paper feeding roller 1201. The leading end of this copy sheet is held between the registration rollers 1191. At a timing that is synchronous to the time the toned image of the photoconductive drum 1110 is moved to a transferring point, the registration rollers 1191 deliver the copy sheet through the location between the transferring roller 1141 and the photoconductive drum 1110. The transferring roller 1141 electrostatically transfers the toned image from the photoconductive drum 1110 to the copy sheet that is delivered by the registration rollers 1191.

The copy sheet, after the image transferring is performed, is delivered to the fixing unit 1161. The fixing unit 1161 performs a thermal fusing of the toner to the copy sheet. The copy sheet, after the thermal fusing is performed, is delivered through the transport passage 1211 to the ejection rollers 1221. The ejection rollers 1221 delivers the copy sheet to the tray 1231 which is provided outside the main body of the laser printer 1000. The cleaning unit 1151 performs a cleaning of the residual toner from the surface of the photoconductive drum 1110.

In the above-described laser printer 1000, OHP (overhead projector) sheets may be used instead of the copy sheet P.

Further, the transferring of the toned image from the photoconductive drum 1110 to the copy sheet may be performed by using an intermediate transferring medium such as an intermediate transferring belt.

In the above-described laser printer 1000, the multi-beam scanning device 1171 according to the present invention can ensure adequate depth clearance when the optical scanning is performed at a high density. The multi-beam scanning device 1171 according to the present invention is effective in reducing the variations of the beam spots on the scanned surface, so that the multi-beam scanning is carried out with accurate beam spot diameter so as to create good quality of a reproduced image. Therefore, the laser printer 1000 in which the multi-beam scanning device 1171 of the present invention is provided can create good quality of a reproduced image.

The present invention is not limited to the above-described embodiment, and variations and modifications may be made without departing from the scope of the present invention.

Further, the present invention is based on Japanese priority application No.2000-044929, filed on Feb. 22, 2000, and Japanese priority application No.2000-046368, filed on Feb. 23, 2000, the entire contents of which are hereby incorporated by reference.

What is claimed is:

1. A multi-beam scanning device comprising:
a semiconductor laser array having a plurality of light emitting parts emitting multiple laser beams,
wherein the multiple laser beams emitted by the light emitting parts of the semiconductor laser array are focused on a scanned surface to form a plurality of beam spots on the scanned surface,
wherein the semiconductor laser array is configured such that the light emitting parts are arrayed along a line that is at an inclination angle $\phi$ to a sub-scanning direction, the inclination angle $\phi$ being measured in degrees and meeting the conditions $0 \leq \phi < 90$, and that a scanning line pitch P, an array pitch $\rho$ of the light emitting parts of the semiconductor laser array and a parameter K defined by the equation $K=0.82 \lambda/\omega z$, where $\lambda$ is a wavelength of the emitted laser beams and $\omega z$ is a target beam spot diameter in the sub-scanning direction, satisfy the following conditions:

$$0.01 < K \cdot P/(\rho \cdot \cos \phi) < 0.30$$

$$0.011 < K < 0.030.$$

2. The multi-beam scanning device of claim 1, further comprising a coupling lens, an aperture stop, and a line focusing lens.

3. The multi-beam scanning device of claim 1, wherein the semiconductor laser arrays is configured such that the inclination angle of the light emitting parts is equal to 0.

4. The multi-beam scanning device of claim 1, wherein the semiconductor laser array is configured such that the inclination angle of the light emitting parts is larger than 0.

5. The multi-beam scanning device of claim 2, wherein the coupling lens is configured to convert the laser beams emitted by the semiconductor laser array into parallel laser beams.

6. The multi-beam scanning device of claim 2 wherein the light emitting parts of the semiconductor laser array emit divergent laser beams, and the coupling lens is configured to convert the laser beams emitted by the semiconductor laser array into less divergent laser beams.

7. The multi-beam scanning device of claim 2 further comprising a rotary deflector, the rotary deflector comprising a rotary polygonal mirror, the rotary polygonal mirror being rotated at a constant speed around a rotation axis of the rotary polygonal mirror, which allows the scanned to be scanned at a constant speed in a main scanning direction with the beam spots.

8. The multi-beam scanning device of claim 5, further comprising a rotary deflector, the rotary deflector comprising a rotary polygonal mirror and the focusing optical system comprises an f$\theta$ lens.

9. The multi-beam scanning device of claim 2, further comprising a line focusing lens, the line focusing lens comprising a cylindrical lens.

10. The multi-beam scanning device of claim 4, further comprising a coupling lens and a rotary deflector, wherein the semiconductor laser array is configured such that the inclination angle of the light emitting parts is approximately equal to 90, the multi-beam scanning device further comprising a main-scanning-direction beam expander provided between the coupling lens and the rotary deflector, the beam expander enlarging the diameter of the laser beams, passed through the coupling lens, in a main scanning direction.

11. An image forming apparatus in which a multi-beam scanning device is provided, the image forming apparatus forming an electrostatic latent image on a scanned surface of a photosensitive medium through an exposure of the photosensitive medium to an imaging light pattern provided by the multi-beam scanning device, the multi-beam scanning device comprising:
a semiconductor laser array having a plurality of light emitting parts emitting multiple laser beams,
wherein the multiple laser beams emitted by the light emitting parts of the semiconductor laser array are focused on a scanned surface to form a plurality of beam spots on the scanned surface,
wherein the semiconductor laser array is configured such that the light emitting parts are arrayed along a line that is at an inclination angle $\phi$ to a sub-scanning direction, the inclination angle $\phi$ being measured in degrees and meeting the condition $0 \leq \phi < 90$, and that a scanning line pitch P, an array pitch $\rho$ of the light emitting parts of the semiconductor laser array and a parameter K defined by the equation $K=0.82 \lambda/\omega z$, where $\lambda$ is a wavelength of the emitted laser beams and $\omega z$ is a target beam spot diameter in the sub-scanning direction, satisfy the following conditions:

$$0.01 < K \cdot P/(\rho \cdot \cos \phi) < 0.30$$

$$0.011 < K < 0.030.$$

12. The image forming apparatus of claim 11, wherein the photosensitive medium is a photoconductive drum, and the image forming apparatus uniformly charges the photoconductive drum and exposes the photoconductive drum to the imaging light pattern provided by the multi-beam scanning device, so that the electrostatic latent image is formed on the scanned surface of the photoconductive drum, and the image forming apparatus developing the latent image of the photoconductive drum with toner and transferring a toned image from the photoconductive drum to a copy sheet.

13. The image forming apparatus of claim 11, wherein the semiconductor laser array is configured such that the inclination angle of the light emitting parts is equal to 0.

14. The image forming apparatus of claim 11, wherein the semiconductor laser array is configured such that the inclination angle of the light emitting parts is larger than 0.

15. The image forming apparatus of claim 11, wherein the multi-beam scanning device further comprises a coupling lens, and the coupling lens is configured to convert the laser beams emitted by the semiconductor laser array into parallel laser beams.

16. The image forming apparatus of claim 11, wherein the multi-beam scanning device further comprises a coupling lens, and the coupling lens comprises a single lens.

17. The image forming apparatus of claim 11, wherein the multi-beam scanning device further comprises a coupling lens, and the light emitting parts of the semiconductor laser array emit divergent laser beams, and the coupling lens is configured to convert the laser beams emitted by the semiconductor laser array into less divergent laser beams.

18. The image forming apparatus of claim 11, wherein the semiconductor laser array is configured such that the array pitch $\rho$ of the light emitting parts is equal to 10 $\mu$m.

19. The image forming apparatus of claim 11, wherein the semiconductor laser array is configured such that the wavelength $\lambda$ of the emitted laser beams is below 700 nm.

20. A light source device for use in a multi-beam scanning device, the light source device comprising:

a semiconductor laser array having a plurality of light emitting parts emitting multiple laser beams;

a coupling lens coupling the multiple laser beams emitted by the laser array; and an aperture stop restricting a diameter of the laser beams passed through the coupling lens, wherein the multi-beam scanning device comprises the semiconductor laser array of the light source device, the multiple laser beams emitted by the light emitting parts of the semiconductor laser array are focused on a scanned surface to form a plurality of beam spots on the scanned surface, wherein the semiconductor laser array is configured such that the light emitting parts are arrayed along a line that is at an inclination angle $\phi$ to a sub-scanning direction, the inclination angle $\phi$ being measured in degrees and meeting the conditions $0 \leq \phi < 90$, and that a scanning line pitch P, an array pitch $\rho$ of the light emitting parts of the semiconductor laser array and a parameter K defined by the equation K=0.82 $\lambda/\omega z$, where $\lambda$ where a wavelength of the emitted laser beams and $\omega z$ is a target beam spot diameter in the sub-scanning direction, satisfy the following conditions:

$$0.01 < K \cdot P/(\rho \cdot \cos \phi) < 0.30$$

$$0.011 < K < 0.030.$$

wherein the aperture stop is configured to have a numerical aperture NAzS in the sub-scanning direction that satisfies the conditions: $0.01 < NAzS < 0.30$.

* * * * *

UNITED STATES PATENT AND TRADEMARK OFFICE
CERTIFICATE OF CORRECTION

PATENT NO. : 6,800,845 B2
DATED : October 5, 2004
INVENTOR(S) : Kohji Sakai et al.

It is certified that error appears in the above-identified patent and that said Letters Patent is hereby corrected as shown below:

Title Page,
Item [*] Notice, please change the following:
"[*] Notice: Subject to any disclaimer, the term of this patent is extended or adjusted under 35 U.S.C. 154(b) by 0 days." to -- [*] Notice: This patent is subject to a terminal disclaimer. --

Signed and Sealed this

First Day of March, 2005

JON W. DUDAS
*Director of the United States Patent and Trademark Office*